(12) United States Patent
Zhang et al.

(10) Patent No.: US 11,633,725 B2
(45) Date of Patent: Apr. 25, 2023

(54) COMPOSITE MATERIAL, ITS MANUFACTURING, GENERATION AND USE IN METHANE CRACKING

(71) Applicant: Nanyang Technological University, Singapore (SG)

(72) Inventors: Lan Zhang, Singapore (SG); Siew Hwa Chan, Singapore (SG); Bin Miao, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 17/246,381

(22) Filed: Apr. 30, 2021

(65) Prior Publication Data

US 2022/0023845 A1  Jan. 27, 2022

(30) Foreign Application Priority Data

Jul. 21, 2020 (SG) .......................... 10202006949Q

(51) Int. Cl.
| | |
|---|---|
| *B01J 23/889* | (2006.01) |
| *B01J 37/00* | (2006.01) |
| *B01J 37/08* | (2006.01) |
| *B01J 37/04* | (2006.01) |
| *C01B 3/26* | (2006.01) |
| *B01J 37/18* | (2006.01) |
| *B01J 37/14* | (2006.01) |
| *B01J 23/00* | (2006.01) |

(52) U.S. Cl.
CPC ....... *B01J 23/8892* (2013.01); *B01J 37/0045* (2013.01); *B01J 37/04* (2013.01); *B01J 37/08* (2013.01); *B01J 37/14* (2013.01); *B01J 37/18* (2013.01); *C01B 3/26* (2013.01); *B01J 23/002* (2013.01); *B01J 23/005* (2013.01); *C01B 2203/0233* (2013.01); *C01B 2203/1241* (2013.01)

(58) Field of Classification Search
CPC .... B01J 23/8892; B01J 37/0045; B01J 37/04; B01J 37/08; B01J 37/14; B01J 37/18; B01J 23/002; B01J 23/005; C01B 3/26; C01B 2203/0233; C01B 2203/1241
USPC ......................................................... 502/303
See application file for complete search history.

(56) References Cited

U.S. PATENT DOCUMENTS

| | | | | |
|---|---|---|---|---|
| 5,028,362 A | * | 7/1991 | Janney .................. | C04B 35/638 264/432 |
| 9,370,767 B2 | | 6/2016 | Zhang et al. | |
| 2005/0096215 A1 | * | 5/2005 | Espinoza ................ | C01B 3/40 502/240 |

FOREIGN PATENT DOCUMENTS

| | | | | |
|---|---|---|---|---|
| CN | 104741131 A | * | 7/2015 | |
| WO | WO-2013122548 A1 | * | 8/2013 | ............ B01J 23/002 |

OTHER PUBLICATIONS

Yiqian Li et al., "Performance and sulfur poisoning of Ni/CeO2 impregnated La0.75Sr0.25Cr0.5Mn0.5O3-d anode in solid oxide fuel cells." Journal of Power Sources 285, pp. 354-359. (Year: 2015).*
Yiqian Li et al., "Sulfur poisoning and the regeneration of the solid oxide fuel cell with metal catalyst-impregnated La0.75Sr0.25Cr0.5Mn0.5O3-d anode." International Journal of Hydrogen Energy 45, pp. 15650-15657. (Year: 2020).*
Inyong Jung et al., "LSCM-YSZ nanocomposites for a high performance SOFC anode." Ceramics International 39, pp. 9753-9758. (Year: 2013).*
E. Lay et al., "Ba-substituted LSCM anodes for solid oxide fuel cells." Journal of Power Sources 221, pp. 149-156. (Year: 2013).*
Xingbao Zhu et al., "Enhanced performance of solid oxide fuel cells with Ni/CeO2 modified La0.75Sr0.25Cr0.5Mn0.5O3-d anodes." Journal of Power Sources 190, pp. 326-330. (Year: 2009).*
Abánades et al., "Technological challenges for industrial development of hydrogen production based on methane cracking," *Energy* 46:359-363, 2012.
Abánades et al., "Thermal cracking of methane into Hydrogen for a $CO_2$-free utilization of natural gas," *International Journal of Hydrogen Energy* 33(20):8491-8496, 2013.
Abbas et al., "Hydrogen production by methane decomposition: A review," *International Journal of Hydrogen Energy* 35(3):1160-1190, 2010.
Aiello et al., "Hydrogen production via the direct cracking of methane over $Ni/SiO_2$: catalyst deactivation and regeneration," *Applied Catalysis A: General* 192:221-234, 2000.

(Continued)

Primary Examiner — Patricia L. Hailey
(74) Attorney, Agent, or Firm — Seed IP Law Group LLP

(57) ABSTRACT

Here disclosed is a composite catalyst for methane cracking and a method of producing the composite catalyst. The composite catalyst includes a substrate formed of metal oxide, and one or more catalytic transition metals solubilized in the metal oxide, wherein the metal oxide includes a metal which differs from the one or more catalytic transition metals, wherein the metal oxide forms a matrix which the one or more catalytic transition metals are solubilized in to render transition metal ions from the one or more catalytic transition metals, wherein the transition metal ions under a reducing atmosphere diffuse to reside as transition metal nanoparticles at a surface of the substrate and the transition metal nanoparticles under an oxidizing atmosphere diffuse away from the surface to reside as transition metal ions in the metal oxide, and wherein the transition metal nanoparticles at the surface induce carbon from the methane cracking to deposit on the transition metal nanoparticles and have the carbon deposited grow away from the substrate.

19 Claims, 27 Drawing Sheets

(56) References Cited

OTHER PUBLICATIONS

Alshibane et al., "Methane Cracking over Cobalt Molybdenum Carbides," *Catalysis Letters* 148:1643-1650, 2018.

Amin et al., "Hydrogen production by methane cracking using Ni-supported catalysts in a fluidized bed," *International Journal of Hydrogen Energy* 37:10690-10701, 2012.

Amin et al., "Review of methane catalytic cracking for hydrogen production," *International Journal of Hydrogen Energy* 36(4):2904-2935, 2011.

Babaei et al., "Pd-promoted (La,Ca)(Cr,Mn) $O_3$/GDC anode for hydrogen and methane oxidation reactions of solid oxide fuel cells," *Solid State Ionics* 181(25-26):1221-1228, 2010.

Baker, "Catalytic growth of carbon filaments," *Carbon* 27(3):315-323, 1989.

Choudhary et al., "Hydrogen Production via Catalytic Decomposition of Methane," *Journal of Catalysis* 199:9-18, 2001.

Donphai et al., "Hydrogen and carbon allotrope production through methane cracking over Ni/bimodal porous silica catalyst: Effect of nickel precursor," *International Journal of Hydrogen Energy* 43:21798-21809, 2018.

Ibrahim et al., "Thermo-Catalytic Methane Decomposition: A Review of State of the Art of Catalysts," *Journal—Chemical Society of Pakistan* 37(6), 2015. (31 pages).

Jiang et al., "Lanthanum strontium manganese chromite cathode and anode synthesized by gel-casting for solid oxide fuel cells," *Journal of Materials Chemistry* 17(25):2621-2635, 2007.

Jin et al., "Preparation of activated carbon supported Fe—$Al_2O_3$ catalyst and its application for hydrogen production by catalytic methane decomposition," *International Journal of Hydrogen Energy* 38:10373-10380, 2013.

Kumar Samanta et al., "Advanced Hydrogen Production through Methane Cracking: A Review," *Science & Technology* 1(3):109-123, 2015.

Marquardt et al., "Hydrogen production by methane decomposition: Analysis of thermodynamic carbon properties and process evaluation," *Energy Conversion and Management* 221:113125, 2020. (14 pages).

McDermott et al., "2020 DOE Hydrogen and Fuel Cells Program Review: Methane Pyrolysis for Base-Grown Carbon Nanotubes and $CO_2$-free $H_2$ over Transition Metal Catalysts," *Pacific Northwest National Laboratory* May 30, 2020. (18 pages).

Monnerat et al., "Hydrogen production by catalytic cracking of methane over nickel gauze under periodic reactor operation," *Chemical Engineering Science* 56:633-639, 2001.

Muradov, "Catalysis of methane decomposition over elemental carbon," *Catalysis Communications* 2:89-94, 2001.

Pinilla et al., "Metallic and carbonaceous-based catalysts performance in the solar catalytic decomposition of methane for hydrogen and carbon production," *International Journal of Hydrogen Energy* 37:9645-9655, 2012.

Robertson, "Graphite Formation from Low Temperature Pyrolysis of Methane over some Transition Metal Surfaces," *Nature* 221:1044-1046, Mar. 15, 1969.

Teo et al., "Catalytic Synthesis of Carbon Nanotubes and Nanofibers," *Encyclopedia of Nanoscience and Nanotechnology* X:1-22, 2003.

Vander Wal et al., "Carbons as Catalysts in Thermo-Catalytic Hydrocarbon Decomposition: A Review," *Journal of Carbon Research* 6(23), 2020. (16 pages).

Villacampa et al., "Catalytic decomposition of methane over Ni—$Al_2O_3$ coprecipitated catalysts Reaction and regeneration studies," *Applied Catalysis A: General* 252:363-383, 2003.

Wang et al., "Methane Pyrolysis for Carbon Nanotubes and $CO_x$-Free $H_2$ over Transition-Metal Catalysts," *Energy Fuels* 33:197-205, 2019.

Wang et al., "Potential oscillation of methane oxidation reaction on $(La_{0.75}Sr_{0.25})(Cr_{0.5}Mn_{0.5})O_3$ electrodes of solid oxide fuel cells," *Journal of Power Sources* 178(1):92-96, 2008.

Zhang et al., "Hydrogen production via the direct cracking of methane over silica-supported nickel catalysts," *Applied Catalysis A: General* 167(2):161-172, 1998.

\* cited by examiner

FIG. 1
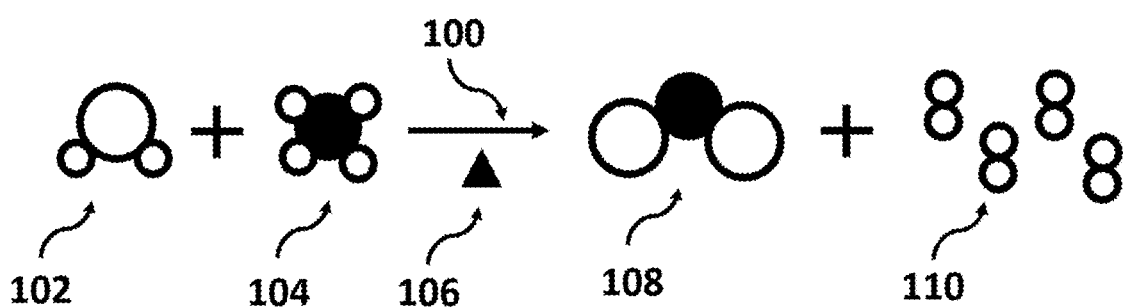
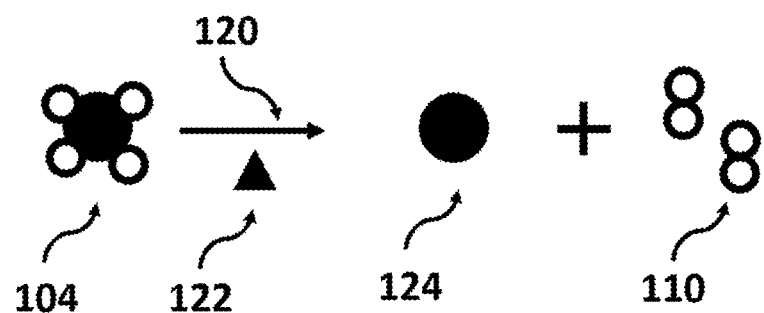

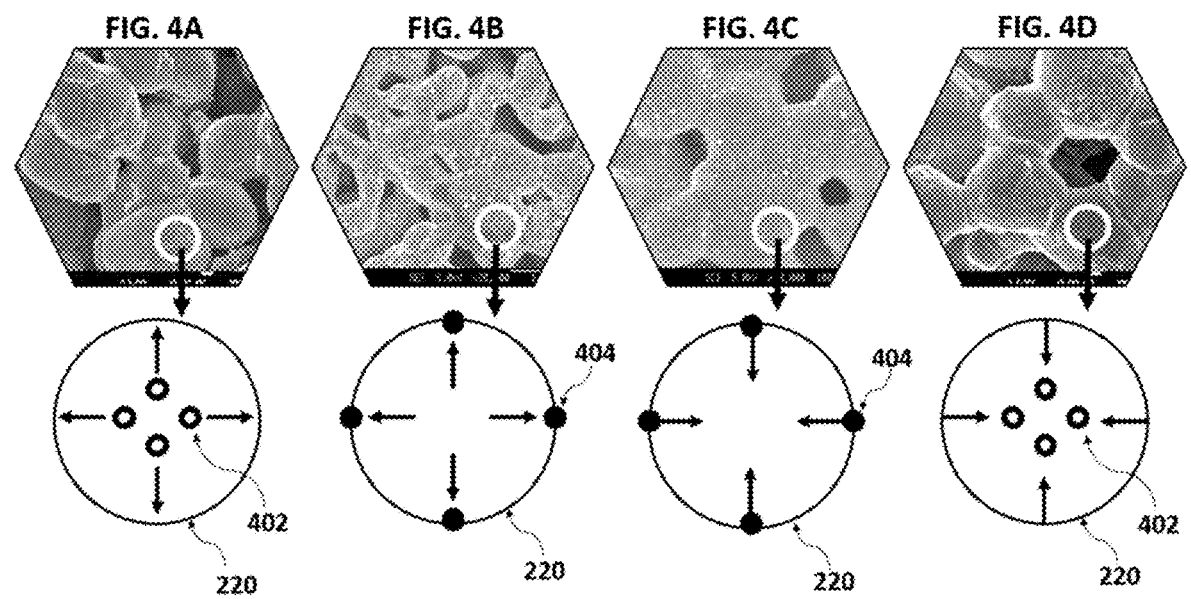
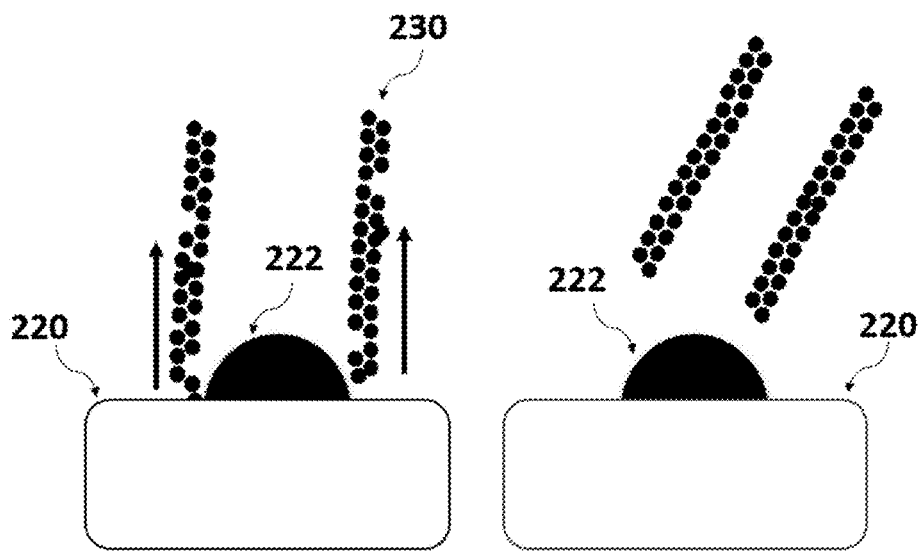
FIG. 5

600
602
604
606
608

COMPOSITE MATERIAL, ITS MANUFACTURING, GENERATION AND USE IN METHANE CRACKING

CROSS-REFERENCE TO RELATED APPLICATION

This application claims priority to Singapore Patent Application No. 10202006949Q, filed Jul. 21, 2020, the content of which is hereby incorporated by reference in its entirety for all purposes.

TECHNICAL FIELD

The present disclosure relates to a composite catalyst for methane cracking. The present disclosure also relates to a method of producing the composite catalyst.

BACKGROUND

The calamitous effect of greenhouse gas (GHG) emission has not only been proven by scientific assessment but also observable from the soaring frequency of extreme weather and natural disasters in recent years. Without efficient ways of $CO_2$ emission mitigation by 2030, the global atmosphere faces a high chance of having a rise-up of 1.5° C. above pre-industrial levels in the coming decades, and the temperature rise may likely lead to an irreversible change of the fragile ecosystems. For GHG emission from the category of fuels, coal, oil and gas contributed to almost the entire $CO_2$ emission, whereas when categorized by sectors, power generation, transportation, manufacturing, and agriculture activities appear to constitute the main emissions. The decarbonization from the fuels and sectors without significantly affecting existing business models and energy supply chains may be a key to mitigating the greenhouse effect. Thus, both energy efficiency and fuel economics tend to be crucial to the energy supply transformation.

Natural gas is considered the "cleanest" primary energy source with only one carbon in the molecule and it can be decarbonized commercially with the mature Steam Methane Reforming (SMR) technology at relative low cost. So far, around 48% of hydrogen in the world is produced from SMR, and SMR appears to be a promising candidate for implementation of Carbon Capture and Sequestration (CCS) technology since the produced carbon concentration is high. However, subsequent handling of the captured $CO_2$ tends to be energy intensive and costly. In urban areas and areas with limited land space, carbon sequestration and bury are very unlikely to be achieved, at least not in the gas form (i.e. $CO_2$).

As an example, Singapore submitted its enhanced Nationally Determined Contribution (NDC) and Long-Term Low-Emissions Development Strategy (LEDS) documents to the United Nations Framework Convention on Climate Change (UNFCCC). The enhanced NDC document updates Singapore's climate pledge under the Paris Agreement, and states an absolute emissions target to peak emissions at 65 metric tons of carbon dioxide equivalent ($MtCO_2e$) around year 2030. Singapore's LEDS builds on the enhanced NDC's target by aspiring to halve our emissions from its peak to 33 $MtCO_2e$ by 2050, with a view to achieve net zero emissions as soon as viable in the second half of the century. The target is extremely challenging as 95% of electricity generated in Singapore relies on natural gas, mostly in combined cycle power plants, which leaves little room for emissions reduction through improved energy efficiency. In addition, Singapore is one of the major oil and gas, and petrochemical refinery centres, which emit significant amount of $CO_2$. Transportation sector is another major source of $CO_2$, contributing almost 20% of the total $CO_2$ emissions in Singapore. The emission control solution lies in how to import or make low emission fuel, preferably hydrogen, at low cost comparable with fossil fuel. Though infrastructure for hydrogen economy has been developing rapidly and many countries, such as Japan and South Korea advocate international hydrogen trading to sustain energy security, the hydrogen cost per kilogram is still too far from being affordable for power generation and industry usage.

Methane cracking is an emerging technology to decarbonize the primary energy source, i.e. natural gas, in Singapore. Methane cracking may produce hydrogen and solid carbon simultaneously. The hydrogen may be readily used in power generation or in fuel cells. The solid carbon may be sold to mature markets, such as the rubber industry and asphalt concrete industry. A preliminary economic study showed that with the contribution of the recovered carbon value (a conservative 500 US$/ton carbon price is assumed), the methane cracking is economically viable (see FIG. 1, bottom row). With further design and optimization of the catalyst and the operation parameters, it is possible to selectively obtain high value-added carbon materials such as carbon nano-onions, carbon nanotubes and graphene, and the economic benefits become more conspicuous.

In methane cracking, catalyst are likely to be used. In this connection, on the aspect of catalyst development, different metals were individually studied as catalyst for methane catalytic cracking. Supported catalysts containing solely noble metals Pt, Rh, Ru, or Ir have showed good performance but cost for such catalyst are unviably high. On the other hand, cheaper transition metals explored may be commercially promising. However, durability of supported nano-size transition metal catalysts remains undesirable.

The main limitation of methane cracking lies in rapid catalyst deactivation due to a carbon fouling phenomena, in which solid carbon fouls inside micro-pores of the catalyst, and deactivates any active surface. Also, regeneration of spent catalyst is a huge challenge for a continuous methane cracking process. The regeneration performance is constrained by the regeneration time and temperature, the degradation kinetics of the regenerated catalyst and the energy efficiency of the regeneration process. Conventionally, air or steam may be added to remove away deposited carbon via a gas product. In both air and steam processes, the surface deposited carbons are oxidized into CO or $CO_2$. In terms of energy efficiency, air regeneration recovers the heating value from solid carbon and thus confers higher energy efficiency. In terms of the hydrogen production, steam regeneration produces extra hydrogen via a water-gas shift reaction, wherein an additional 1.4 moles of hydrogen is produced and overall yield of 3.4 mole hydrogen can be collectable therefrom.

The catalytic methane cracking reaction temperature may be between 650° C. to 750° C., which is much lower than a synthetic graphite recrystallization process of over 3000° C. Experimental evidence from electron diffusion, X-ray powder and electron microprobe analysis show the equivalent properties of methane catalytic pyrolysis of carbon to the natural/synthetic graphite. However, it was found that catalyst of solely single transition metals, e.g. nickel, cobalt, or iron, are more effective in catalyzing graphite formation from methane as feedstock at low temperature. Hence, the selection of catalyst not only affects the reaction conditions but also influences the by-product properties. The rate of activity of transition metals may be in order as follows: Co, Ru, Ni, Rh>Pt, Re, Ir>Pd, Cu, W, Fe, Mo. Among all the supported catalyst, Ni, Co and Fe are popular due to their high catalytic activity and low reaction temperature and it was found that catalyst supports also affects the catalytic performance. Different catalysts may have their pros and cons based on reports. For example, even though Co is more expensive, it provides higher stability and more active sites. By using solely Co as the catalyst, quality of the carbon produced was found to be able to increase the value of the reaction.

There is thus a need to provide for a solution that addresses one or more of the limitations mentioned above. The solution should at least provide for a composite catalyst operable to crack methane.

SUMMARY

In a first aspect, there is provided for a composite catalyst for methane cracking, the composite catalyst includes:
a substrate formed of metal oxide; and
one or more catalytic transition metals solubilized in the metal oxide,
wherein the metal oxide includes a metal which differs from the one or more catalytic transition metals,
wherein the metal oxide forms a matrix which the one or more catalytic transition metals are solubilized in to render transition metal ions from the one or more catalytic transition metals,
wherein the transition metal ions under a reducing atmosphere diffuse to reside as transition metal nanoparticles at a surface of the substrate and the transition metal nanoparticles under an oxidizing atmosphere diffuse away from the surface to reside as transition metal ions in the metal oxide, and
wherein the transition metal nanoparticles at the surface induce carbon from the methane cracking to deposit on the transition metal nanoparticles and have the carbon deposited grow away from the substrate.

In another aspect, there is provided for a method of producing the composite catalyst described in various embodiments of the first aspect, the method includes:
milling a mixture including transition metal oxide and a precursor of the one or more catalytic transition metals in an aqueous medium;
drying the mixture to form a homogeneously mixed powder; and
subjecting the homogenously mixed powder to calcination to produce the composite catalyst.

BRIEF DESCRIPTION OF THE DRAWINGS

The drawings are not necessarily to scale, emphasis instead generally being placed upon illustrating the principles of the present disclosure. In the drawings, identical numeral reference denotes for the same element. In the following description, various embodiments of the present disclosure are described with reference to the following drawings, in which:

FIG. 1 shows the chemical reactions for steam methane reforming 100 (top row) and methane cracking 120 (bottom row). In steam methane reforming 100, water 102 and methane 104 (e.g. 4 Tons×USD 150/ton=USD 600) are reacted in the presence of a catalyst and heat 106 to produce carbon dioxide 108 (11 Tons×−5 USD/Ton=−USD 55) and hydrogen 110 (2 Tons×USD 1500/Ton=USD 3000). In methane cracking 120, methane 104 (e.g. 4 Tons×USD 150/ton=USD 600) is broken down in the presence of a catalyst and heat 122 to produce carbon 124 (3 Tons×500 USD/Ton=USD 1500), such as in the form carbon nano-onions (i.e. a member of the fullerene family and may be a multi-layered fullerene), and hydrogen 110 (1 Ton×USD 1500/Ton=USD 1500).

FIG. 4A illustrates activation of the present composite catalyst under a reducing atmosphere. In a reducing atmosphere, the metal ions 402 (also termed herein "ionic metal atoms") residing in the matrix of the substrate 220 (e.g. a metal oxide of the present disclosure) has low solubility which renders the metal ions to migrate and diffuse toward surface of the substrate.

FIG. 4B illustrates activation of the present composite catalyst under a reducing atmosphere. Under a reducing atmosphere, after the metal ions 402 migrated and diffused to the surface of the substrate 220 as shown in FIG. 4A, the metal ions 402 reside and remain at the surface as metal nanoparticles 404, as the metals ions 402 have lower solubility in the substrate 220 under the reducing atmosphere.

FIG. 4C illustrates regeneration of the present composite catalyst under an oxidizing atmosphere. After methane cracking, the present composite catalyst may be subject to an oxidizing atmosphere. Under an oxidizing atmosphere, the metal nanoparticles 404 regain solubility and start to migrate/diffuse back into the matrix of the substrate 220 after being used.

FIG. 4D illustrates the regenerated composite catalyst of the present disclosure under an oxidizing atmosphere. The metal ions 402 reside and remain in the substrate 220 under an oxidizing atmosphere as the metal ions 402 have higher solubility in the substrate 220.

FIG. 5 illustrates carbon formation by "base-growth" mechanism from the present composite catalyst, particularly on the substrate 220, and detachment of the carbon (in the form of filaments, or even in the form of carbon nanotubes) from the present composite catalyst. The substrate 220 can be a metal oxide. As can be seen in the left image, the carbon grows and extends into a filament or nanotube 230 in a direction away from the substrate 220 of the present composite catalyst. This happens in a reducing atmosphere where metal nanoparticles reside at surface of the substrate 220. In the right image, the metal nanoparticles 222 is firmly anchored at the surface of the catalyst substrate 220, and the carbon grows to an extent and can be spontaneously detached from the substrate 220 on its own.

DETAILED DESCRIPTION

Figure 2A:
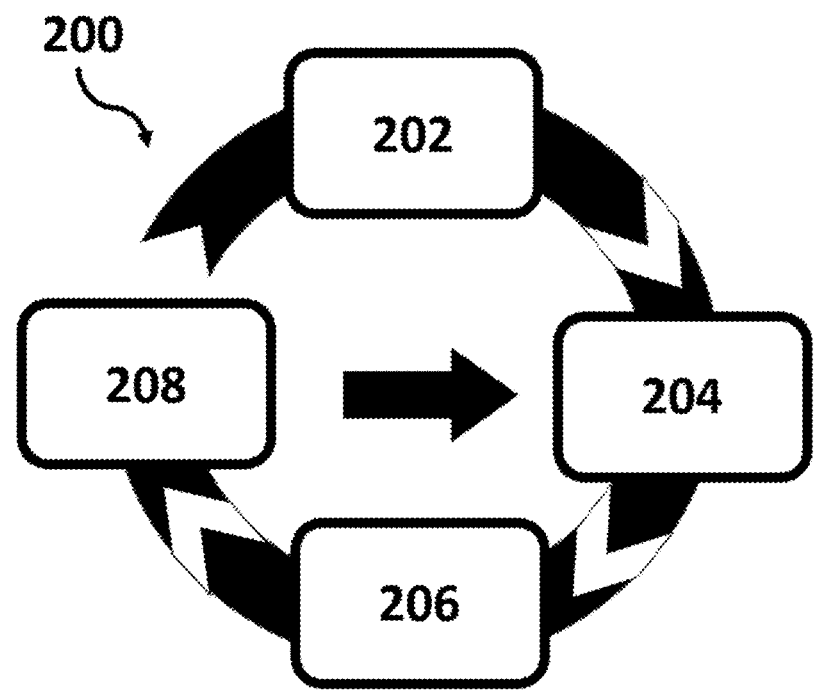
FIG. 2A shows an ecology loop 200 (i.e. lifecycle) of the present composite catalyst. The present composite catalyst is first prepared as catalyst beads 202. The first prepared catalyst beads 202 are then activated 204 for methane cracking. After methane cracking, the used catalyst beads 206 then undergo regeneration to become regenerated catalyst beads 208. The regenerated catalyst 208 beads can be used and activated 204 again for methane cracking.

The following detailed description refers to the accompanying drawings that show, by way of illustration, specific details and embodiments in which the present disclosure may be practiced.

Features that are described in the context of an embodiment may correspondingly be applicable to the same or similar features in the other embodiments.

Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The present disclosure relates to a composite catalyst. The composite catalyst can be used in methane cracking. The composite catalyst may be a ceramic composite that includes one or more catalytic transition metal. The composite catalyst includes a substrate and one or more catalytic transition metals. The substrate can be a metal oxide substrate. The one or more catalytic transition metals can include at least one catalytic transition metal and/or at least two catalytic transition metals.

The substrate of the composite catalyst, e.g. a metal oxide, serves as the matrix for which the one or more catalytic transition metals can be solubilized therein. The term "solubilized" and grammatical variants thereof herein means that the one or more catalytic transition metals can reside in the substrate, e.g. matrix of a metal oxide, and migrate or diffuse (i) within the matrix of the substrate and (ii) out to surface of substrate. In other words, the one or more catalytic transition metals can reside as mobile ions in the substrate. At the surface of the substrate, the one or more catalytic transition metals reside as transition metal nanoparticles.

Advantageously, the composite catalyst can be easily separated from carbon product and regenerated after used in methane cracking. During methane cracking, carbon deposits on the composite catalyst, including both the substrate and catalyst. The carbon blocks active catalytic site of the present composite catalyst, e.g. an active site of the catalytic transition metal. However, the present composite catalyst allows for easy removal and detachment of the carbon from the composite catalyst, as the present composite catalyst promotes the growth of carbon via a base-growth mechanism as shown in right image of FIG. 2B and has a coefficient of thermal expansion (CTE) that confers such advantage. Further advantageously, the one or more catalytic transition metals and the substrate of the present composite catalyst synergistically confer carbon resistance, i.e. resist carbon attachment thereon. Accordingly, the present composite catalyst provides for a base-growth mechanism, CTE and carbon resistance, all of which promotes separation of carbon from the present composite catalyst without loss of the one or more catalytic transition metals.

When the used (i.e. spent) composite catalyst is subjected to an oxidizing environment under high temperature (e.g. 800° C. to 1400° C.), the one or more transition metal nanoparticles migrates back into the substrate to reside as ions. With migration of the one or more transition metal nanoparticles from surface of substrate into the matrix, the present composite catalyst is regenerated.

Details of various embodiments of the present composite catalyst and its method of production, and advantages associated with the various embodiments are now described below.

In the present disclosure, there is provided a composite catalyst for methane cracking. The composite catalyst includes a substrate formed of metal oxide and one or more catalytic transition metals solubilized in the metal oxide.

The metal oxide can include a metal which differs from the one or more catalytic transition metals. The metal oxide forms a matrix which the one or more catalytic transition metals can be solubilized in to render transition metal ions from the one or more catalytic transition metals.

The transition metal ions under a reducing atmosphere diffuse to reside as transition metal nanoparticles at a surface of the substrate and the transition metal nanoparticles under an oxidizing atmosphere diffuse away from the surface to reside as transition metal ions in the metal oxide. Diffusion of the transition metal nanoparticles away from the surface includes the transition metal nanoparticles diffusing back into the metal oxide to reside therein as transition metal ions.

The transition metal nanoparticles at the surface induce carbon from the methane cracking to deposit on the transition metal nanoparticles and can have the carbon deposited grow away from the substrate.

The metal oxide and the carbon deposited can have different thermal expansion coefficient, which renders separation of the carbon from the substrate when the composite catalyst is cooled after being channeled out of a reactor operable to accelerate the methane cracking or to crack methane. The reactor can be any reactor operable to crack methane, i.e. produce carbon and hydrogen from methane.

As mentioned above, the substrate can include or can be a metal oxide. The metal oxide can include a cobalt-based metal oxide, a nickel-based metal oxide, a chromium-based metal oxide, an iron-based metal oxide, manganese-based oxide, or a molybdenum-based metal oxide. The chromium-based metal oxide can include chromium (III) oxide or lanthanum strontium manganese chromite. The metal oxide can also include or can be an oxide having a perovskite structure or spinel structure. For example, the metal oxide can have a spinel structure, a structure identical to a perovskite, or a double perovskite structure. Oxides (e.g. metal oxide substrates of the present disclosure) with spinel structure, perovskite structure, and/or a double perovskite structure are stable under both reducing and oxidizing atmospheres, allowing for regeneration of the present composite catalyst without the substrate deteriorating. The terms "spinel structure" and "perovskite structure" are herein interchangably used with "spinel phase" and "perovskite phase", respectively.

A metal oxide of the present disclosure, for example a metal oxide having a spinel phase, can be denoted by the formula $(A_xB_{3-x})O_4$, wherein A and B each represents a different metal, and each of A and B represents cobalt (Co), iron (Fe), chromium (Cr), nickel (Ni), manganese (Mn), aluminum (Al), etc., and x is a real number being 3 or less. A metal oxide of the present disclosure, for example a metal oxide having a perovskite phase, can be denoted by the formula $(AB_xM_{1-x})O_3$, wherein A, B and M each represents a different metal, and A denotes for lanthanum (La), strontium (Sr), etc., B denotes for chromium (Cr), manganese (Mn), cobalt (Co), etc., M denotes for nickel (Ni), iron (Fe), etc., and x is a real number being 1 or less and 1-x is optionally more than 0. In certain instances, non-stoichiometric ratios are considered, such that 1-x may be more than zero. A metal oxide of the present disclosure, for example a metal oxide having a double perovskite phase, can be denoted by the formula $(A_2(B'B'')_xM_{2-x})O_3$, wherein A, B', B'' and M each represents a different metal, and A denotes for lanthanum (La), strontium (Sr), etc., B' and B'' each denotes for chromium (Cr), manganese (Mn), cobalt (Co), etc., M denotes for nickel (Ni), iron (Fe), etc., and x is a real number being 2 or less and 2-x is optionally more than 0. In certain instances, non-stoichiometric ratios are considered, such that 2-x may be more than 0.

The metal oxide can be about 50 wt % or more, about 60 wt % or more, about 70 wt % or more, about 80 wt % or more, etc. of the composite catalyst.

In various aspects, the one or more catalytic transition metals can include cobalt, nickel, chromium, iron, manganese, molybdenum, tungsten, or vanadium. Any other transition metal operable to catalyze methane cracking into carbon and hydrogen can be included as the one or more catalytic transition metals.

During methane cracking, the present composite catalyst may be subject to a reducing atmosphere (i.e. condition or environment that is absent of oxygen). The reducing atmosphere can include hydrogen, and a temperature ranging from 400° C. to 1000° C., 500° C. to 1000° C., 600° C. to 1000° C., 700° C. to 1000° C., 800° C. to 1000° C., 900° C. to 1000° C., 400° C. to 900° C., 400° C. to 800° C., 400° C. to 700° C., 400° C. to 600° C., 400° C. to 500° C., etc. Advantageously, the present composite catalyst is flexibly operable over such ranges of temperatures for methane cracking.

To regenerate the composite catalyst, the composite catalyst may be subject to an oxidizing atmosphere. The oxidizing atmosphere can include oxygen and/or air, and a temperature ranging from 800° C. to 1400° C., 900° C. to 1400° C., 1000° C. to 1400° C., 1100° C. to 1400° C., 1200° C. to 1400° C., 1300° C. to 1400° C., 800° C. to 1300° C., 800° C. to 1200° C., 800° C. to 1100° C., 800° C. to 1000° C., 800° C. to 900° C., etc. Advantageously, at such temperatures, the transition metal nanoparticles can diffuse back into the metal oxide substrate, i.e. lower temperatures may significantly affect diffusion back into the metal oxide substrate. The air may contain oxygen.

In the first aspect, the composite catalyst may include the metal oxide and one catalytic transition metal. The metal of the metal oxide and the one catalytic transition metal may be present in a mole ratio ranging from 5:1 to 1:5.

In various aspects, the composite catalyst can include or consist of $La_{0.75}Sr_{0.25}Cr_{0.5}Mn_{0.5}Ni_xO_3$, wherein x denotes a real number ranging from 0 to 3, e.g. more than 0 and to 3.

In various aspects, the composite catalyst can further include a sintering additive, wherein the sintering additive comprise $ZrO_2$, $Al_2O_3$, $CeO_2$, $SiO_2$, or a clay. Such sintering additive strengthens density of the present composite catalyst to prevent deposition of carbon on the surface of the inner pores of the present composite catalyst. Deposition of carbon on the surface of the inner pores may undesirably damage or create internal stress that pulverizes the present composite catalyst.

The present disclosure also provides for a method of producing the present composite catalyst described according to various embodiments of the first aspect mentioned above. Embodiments and advantages described for the composite catalyst of the first aspect can be analogously valid for the present method subsequently described herein, and vice versa. As the various embodiments and advantages have already been described above and in the examples demonstrated hereinbelow, they shall not be iterated for brevity.

The present method of producing the composite catalyst described in various embodiments of the first aspect can include milling a mixture including a transition metal oxide and a precursor of the one or more catalytic transition metals in an aqueous medium, drying the mixture to form a homogeneously mixed powder, and subjecting the homogenously mixed powder to calcination to produce the composite catalyst.

The precursor of the one or more catalytic transition metals comprises cobalt oxide, nickel oxide, chromium oxide, iron oxide, manganese oxide, molybdenum oxide, tungsten oxide, or vanadium oxide.

In various aspects, the present method may further include sintering the composite catalyst.

In the present method, the calcination and sintering may be carried out at a temperature ranging from (i) 900° C. to 1200° C., 1000° C. to 1200° C., 1100° C. to 1200° C., 900° C. to 1100° C., 900° C. to 1000° C., etc. for 6 to 24 hours, 12 to 24 hours, 18 to 24 hours, 6 to 18 hours, 6 to 12 hours, etc. and (ii) 1200° C. to 1500° C., 1300° C. to 1500° C., 1400° C. to 1500° C., 1200° C. to 1400° C., 1200° C. to 1200° C., etc. for 2 to 10 hours, 3 to 10 hours, 4 to 10 hours, 5 to 10 hours, 6 to 10 hours, 7 to 10 hours, 8 to 10 hours, 9 to 10 hours, etc., respectively.

The present method may further include, prior to the sintering, milling the homogeneously mixed powder in the presence of an aqueous solution comprising at least two monomers, an initiator, a catalyst, and a dispersant.

In various aspects, the at least two monomers can include an acrylamide and/or N,N'-methylenebisacrylamide. The at least two monomers are for a polymerization reaction to be carried out.

In various aspects, the dispersant can include ammonium poly(methacrylate).

The present method may include, after milling the homogeneously mixed powder in the presence of the aqueous solution but prior to the calcination, mixing the homogeneously mixed powder with the initiator and the catalyst for polymerization of the at least two monomers.

In various aspects, the initiator can include ammonium bisulfate, and the catalyst can include tetramethylethylenediamine.

The word "substantially" does not exclude "completely" e.g. a composition which is "substantially free" from Y may be completely free from Y. Where necessary, the word "substantially" may be omitted from the definition of the present disclosure.

In the context of various embodiments, the articles "a", "an" and "the" as used with regard to a feature or element include a reference to one or more of the features or elements.

In the context of various embodiments, the term "about" or "approximately" and the symbol "~" as applied to a numeric value encompasses the exact value and a reasonable variance. The variance may be ±10%, ±5%, ±1%, etc.

As used herein, the term "and/or" includes any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

EXAMPLES

The present disclosure provides for a composite material, which is a ceramic composite material that may be molded into any desired shape. The composite material has catalytic activity for accelerating methane cracking and/or pyrolysis. Such a composite material may be herein interchangeably termed a "catalytic composite material", "composite catalyst", or "methane cracking catalyst". The present composite material possesses regeneration characteristics, i.e. can be regenerated.

The composite catalyst of the present disclosure is operable for methane cracking to produce hydrogen gas and solid carbon. In particular, the present composite catalyst has elongated lifespan as a methane cracking catalyst, as the present composite catalyst has enhanced robustness at least in terms of carbon resistance and anti-sulphur poisoning properties. Also, the present composite catalyst has desirable durability, thermal expansion coefficient, thermal shock resistance, mechanical strength, catalytic reactivity, low production cost, economically scalable and can be regenerated. Advantageously, formulation of the present composite catalyst renders different high-value carbon materials producible, including but not limited to, carbon nanofibers (CNFs), carbon nanotubes (CNTs), carbon nano-onions (CNOs), and graphene, thereby maximising economic returns of processes involving the present composite catalyst. Comparison between advantages afforded by the present composite catalyst and commercially available catalyst are listed in Table 1 below.

TABLE 1

Comparative analysis between present composite catalyst and three commercially available catalysts

| Features of Catalyst for Methane Cracking | Present Composite Catalyst | Catalyst X1 | Catalyst X2 | Catalyst X3 |
|---|---|---|---|---|
| Low cost of raw materials | ✓ | x | ✓ | ✓ |
| Simple production process | ✓ | x | ✓ | ✓ |
| Wide range of raw material selection | ✓ | x | ✓ | ✓ |
| Low cost of catalyst product | ✓ | x | ✓ | ✓ |
| Long lifespan | ✓ | x | x | x |
| Regeneration | ✓ | x | x | x |
| Low catalyst loss rate | ✓ | x | x | x |
| Achieved desirable nano-carbon products | ✓ | x | x | x |
| Carbon deposition: Tip growth or Base growth | Mixture | Tip | Tip | Tip |
| High resistivity of sulfur poisoning | ✓ | x | x | x |
| Good thermal expansion coefficient | ✓ | N.A. | N.A. | N.A. |
| Good thermal shock resistance | ✓ | N.A. | N.A. | N.A. |

"x" means the required technical parameter is not fulfilled. "✓" means the required technical parameter is fulfilled. "N.A." means the required technical parameter is not even provided for by the catalyst.

As mentioned in the background section above, a considerable challenge of methane cracking lies in the cost, selectivity, regeneration, and durability of catalysts. Currently available noble metal catalyst using solely platinum (Pt), rhodium (Rh), ruthenium (Ru), or iridium (Ir) has shown good performance but the costs are too high. Cheap iron ore catalyst is undesirably consumed during reactions, becomes solid waste and have to be frequently replenished. The present composite catalyst addresses such limitations.

Figure 2B:
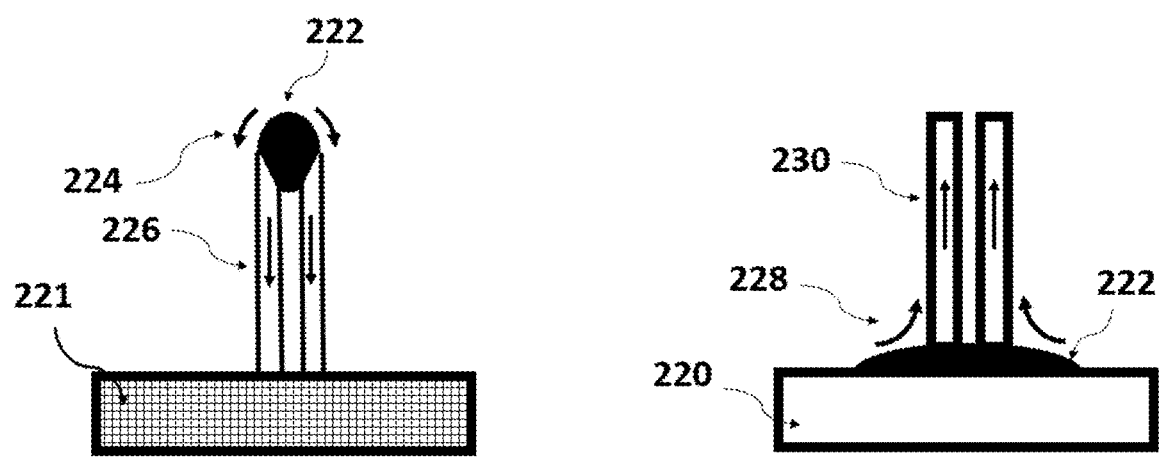
FIG. 2B shows two different carbon growth mechanism, which is affected by the strength of interaction between the metal catalyst 222 and substrate 220, 221. The left image shows a "tip-growth" mechanism of carbon formation from conventional catalyst. The right image shows "base-growth" mechanism of carbon formation rendered by the present composite catalyst. In the left image, the carbon grows from underneath the catalyst 222 during methane cracking, positioning the catalyst away from the surface of the substrate 221. The carbon deposited on the catalyst 222 actually migrates downward 224 and grows toward the substrate 221 to extend the tip of the carbon filament 226 away from the substrate 221, rendering the catalyst 222 further away from the substrate 221. In this instance, the carbon filament 226 breaks off or is susceptible to be broken off from the substrate 221 along with the catalyst 222, leading to loss of metal from the catalyst. This is referred to as "tip-growth" mechanism as the catalyst 222 gets positioned at the tip of the carbon filament 226 away from the substrate 221. The substrate 221 may be a significantly porous metal oxide substrate, e.g. a zeolite substrate that is a composite of MCM-41 and $Al_2O_3$ (MCM-41/$Al_2O_3$). In the right image, carbon grows from catalyst 222 on the substrate 220 and the carbon filament 230 extends away from the substrate 220 and catalyst 222. The catalyst 222 continues to reside at surface of the substrate 220 and forms the base from which the carbon filament 230 grows, and hence referred to as "base-growth" mechanism. The carbon deposited on the catalyst 222 actually migrates upwards 228 away from the catalyst 222 and substrate 220. The catalyst 222 and substrate 220 may be a composite catalyst and metal oxide substrate of the present disclosure, respectively. The substrate 220 is non-porous and denser than the substrate 221. Substrate 220 of the present disclosure confers base-growth of carbon, as the catalyst 222 resides at the surface of the substrate 220 as nanoparticles that may promote carbon compliance and the substrate 220 is a matrix material that may be resistant to carbon deposition.

The present composite catalyst is a self-supported transition metal oxide-based catalyst fabricated by a ceramic moulding technique, for example, a gel-casting method which reduces the fabrication cost significantly. The present composite catalyst also exhibits excellent re-generative property and recovery of high-value carbon products from surface decomposition. It is a viable alternative to noble metals for high-performance methane cracking, owing to its high selectivity, high durability, high mechanical strength, low production cost and being easily scalable for mass production. FIG. 2A illustrates an ecology loop 200 (i.e. lifecycle) of the present composite catalyst.

The present composite catalyst and its method of fabrication are described in further details, by way of non-limiting examples, as set forth below.

Example 1: Catalytic Activity and Regeneration of Present Composite Catalyst

Figure 3:
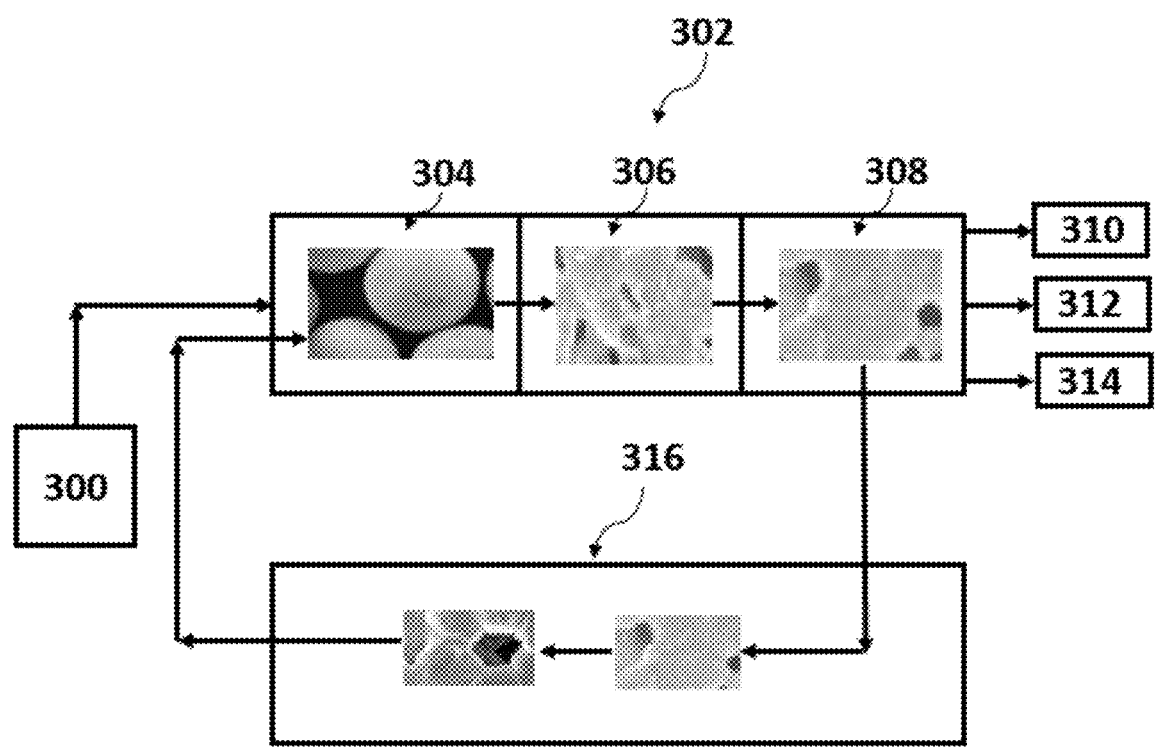
FIG. 3 is a schematic drawing of a methane cracking system described in the present disclosure. Methane 300 is first introduced into a reactor 302 (e.g. rotary methane cracker) housing the composite catalyst (catalyst beads) of the present disclosure. The reactor can have four different zones, namely pre-heating zone 304, working zone 306, cooling zone 308, and regeneration zone 316, which correspond to activities of the present composite catalyst, i.e. activation of catalyst, facilitation of reaction, separation of carbon materials and catalyst beads, and regeneration of the present composite catalyst, respectively. Each of the temperature range for the pre-heating zone 304, working zone 306, cooling zone 308, and regeneration zone 316 is about 400 to 800° C., about 800 to 1000° C., about 800 to 600° C., and 800 to 1200° C. (or 800 to 1400° C.), respectively.

The present composite catalyst can be activated and regenerated in situ in the methane cracking reactor as uniquely configured and described herein, i.e. under a controlled reactor environment. Particularly, activation and regeneration of the present composite catalyst are achieved at different temperatures and/or different zones of a rotary reactor. As a non-limiting example, FIG. 3 shows a schematic of a rotary methane cracker system 302. There are four zones illustrated, namely pre-heating zone 304, working zone 306, cooling zone 308, and regeneration zone 316, which correspond to activities of the present composite catalyst, i.e. activation of catalyst, facilitation of reaction, separation of carbon materials and catalyst beads, and regeneration of the present composite catalyst, respectively. The temperature range in pre-heating zone 304, working zone 306 and cooling zone 308 are about 400 to 800° C., about 800 to 1000° C., and about 800 to 600° C., respectively. A reducing environment, which promotes the catalyst activation, is sustained by presence of methane and hydrogen gas in the reactor. In catalyst regeneration zone 316, air is introduced and ventilated therein, and an oxidizing atmosphere is thus provided. Both the oxidizing atmosphere and high temperatures (e.g. 800 to 1400° C.) aid the catalyst regeneration process 316.

The mechanisms of catalyst activation and regeneration are shown in FIG. 4A to 4D. At first, the fresh composite catalyst (i.e. catalyst beads) are fed into the pre-heating zone 304 for activation. Small amount of COX may be generated if the catalyst is activated in situ under methane atmosphere. The reducing environment (excess reductant, i.e. reducing gas present in excess) and the temperature gradient in this pre-heating zone 304 are factors to be considered for activation of the catalyst. A temperature gradient exists such that the temperature in the center of the reactor (e.g. excluding the catalyst regeneration zone 316) is higher than the temperatures at both ends (upstream and downstream of the center) of the reactor. Under a reducing condition, the metal in the present composite catalyst has low solubility in the substrate (e.g. metal oxide). The low solubility renders the metal to diffuse out from the substrate via exsolution and to reside on the surface of the composite catalyst particle (see FIGS. 4A and 4B). The metal residing at the surface confers catalytic activity for methane cracking. The substrate can be a metal oxide. Exsolution here refers to a process through which a homogeneous solid solution separates into at least two separate phases in the solid sate without the addition or removal of any materials. The at least two separate phases may each include a distinct crystalline mineral. The term "solid solution" herein refers to a mixture of two crystalline solids that coexist as a single crystalline solid.

The present composite catalyst may be partially deactivated due to carbon formation on the active metal surface during methane cracking. At the cooling zone 308, most of the carbon can be removed by a thermal force induced by the distinct coefficients of thermal expansion (CTE) between that of the carbon and the substrate. The present composite catalyst works based on a "base-growth mechanism", as illustrated in right image of FIG. 2B and FIG. 5, which aids the carbon removal process in a manner that prevents the active metal from dropping off the substrate. The catalyst regeneration can be performed using a conveyor belt that transfers the spent catalyst out of the methane cracking reactor 302 into a catalyst regeneration zone 316 where temperature is controlled, and an oxidation condition is provided. As illustrated in FIGS. 4C and 4D, the metal diffuses back into the lattice (i.e. matrix) of the substrate as the metal has a higher solubility under an oxidizing condition. The conveyor belt can then recirculate the cleaned composite catalyst back into the methane cracking reactor 302, ready for the next round use.

Example 2: General Discussion on Carbon Growth

The present composite catalyst renders a "base-growth" carbon formation pattern so that the present composite catalyst can be reused without significant metal loss. If the metal of a catalyst is lost, catalytic activity and performance of the catalyst deteriorate. The term "base-growth" herein refers to a mechanism where carbon grows from the base and extends into, for example, a filament by which nanotubes are formed without catalyst metal lost, as illustrated in right image of FIG. 2B. Generally, the carbon formation mechanism may depend on the characteristics of the metal present in a catalyst, and may also depend on the metal particle size, metal dispersion (i.e. distribution of metal), and metal-support interaction (i.e. interaction between metal and a catalyst support). It was found that nano-sized metal particles (e.g. less than 1.8 nm) promote single-wall nanotube and base-growth mechanism. Advantageously, base-growth mechanism leads to a temporary deactivation of the catalyst due to blockage of active metal, wherein activity of the catalyst can be restored after subjecting the used composite catalyst of the present disclosure to the regeneration process.

The carbon formation mechanism promotes electrical property such as high conductivity and low resistance of, for example, graphitic carbon. The base-growth mechanism of methane pyrolysis using various transition metal catalysts, i.e. catalyst solely of one transition metal, were first studied. It was found that iron (Fe) catalysts effectively promote "base growth" carbon nanotubes (CNT) on different catalyst supports, such as $Al_2O_3$, $SiO_2$, and H-ZSM-5 supports. The process also produces COX-free hydrogen (i.e. hydrogen free of oxides of carbon) as "by-product" in fuel cell application. The strong interaction between the Fe catalyst and the $Al_2O_3$ support renders "base-growth" mechanism. The produced CNTs recovered from a Fe catalyst supported on $Al_2O_3$ can reach 96% purity based on thermal gravimetric analysis. Though the carbon morphology from methane cracking may vary with reaction conditions, the carbon products include mostly filamentous carbon, single-wall carbon nanotubes, and multi-wall carbon nanotubes.

With the base-growth mechanism, the catalyst lifespan can be elongated as carbon can be easily removed (e.g. by scrubbing off) from the surface of the metal and the catalyst can be reused again. The inner pore can be further cleaned of carbon by regeneration using dry-reforming, air-regeneration, and/or steam-regeneration, which results in an insignificant amount of $CO_2$ emissions. The present composite catalyst and the regeneration process are promising for overcoming the carbon fouling phenomena.

In an example studied, the periodic injection of $H_2$ inhibits both carbon filament formation and encapsulation of metal catalyst particles by coke, which protected the catalyst from total failure. It was also found that partial recovery of catalyst from carbon deposition may alternatively be a sustainable option. In a partial recovery, any remaining carbon may prevent the catalyst structure from disintegration during the regeneration process. This is especially helpful for the fluid bed and rotary type reactor operation where mechanical damage to the catalyst may extensively occur.

Example 3: Pristine Transition Metal Oxide Powder as Catalyst (Comparative Example)

In this example, the raw materials were investigated as comparative examples to show that the raw materials alone do not confer advantages of the present composite catalyst even though the raw materials are used to form the present composite catalyst. The weight change of the raw materials used as catalyst without further treatment is shown in Table 2. As listed in Table 2, the experimental weight loss of NiO, $Co_3O_4$ and $Fe_2O_3$ is nearly same as that of theoretical value under reducing atmosphere. However, the experiment weight loss of $Cr_2O_3$ and $MnCO_3$ is significantly lower than that of theoretical weight loss, which imply that $Cr_2O_3$ and $MnCO_3$ retain their oxide state without forming metal (as denoted by N.A. in Table 2 below). The carbon yield of NiO treated in pure $CH_4$ at 850° C. for 5 hours is up to 5.37 $g_{carbon}/g_{catalyst}$, which demonstrated that NiO can be directly used as catalyst for accelerating methane pyrolysis reaction. The unit of $g_{carbon}/g_{catalyst}$ is abbreviated as g $C/g_{cata.}$ for brevity. The carbon yield of $Co_3O_4$ and $Fe_2O_3$ is 1.66 g $C/g_{cata.}$ and 0.87 g $C/g_{cata.}$, respectively, obviously lower than that of NiO under the same condition. The carbon yield of $Cr_2O_3$ and $MnCO_3$, which is nearer to zero, imply that $Cr_2O_3$ and $MnCO_3$ enhance the pyrolysis reaction of methane to a lower extent.

TABLE 2

Weight change of raw materials

| Sample | Theoretical weight loss after full reduction/(%) | Experimental weight loss in $H_2$ atmosphere/(%) | Carbon yield/ (g $C/g_{cata.}$) |
|---|---|---|---|
| NiO | 21.4 | 21.6 | 5.37 |
| $Co_3O_4$ | 26.5 | 26.7 | 1.66 |
| $Cr_2O_3$ | 31.5 | 0.2 | N.A. |
| $Fe_2O_3$ | 30.1 | 30.1 | 0.87 |
| $MnCO_3$ | 52.2 | 40.1 | N.A. |

Figure 6A:
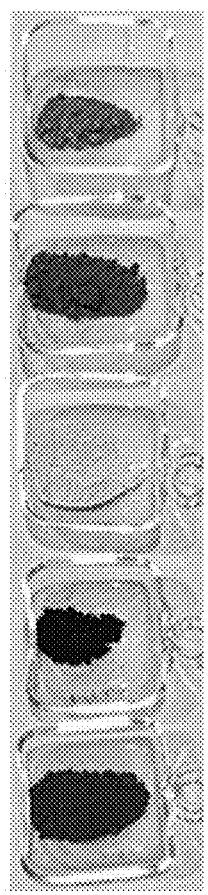
FIG. 6A is a column of optical photographs of the raw materials NiO 600, $Cr_2O_3$ 602, $MnCO_3$ 604, $Co_3O_4$ 606, and $Fe_2O_3$ 608.
Figure 6B:
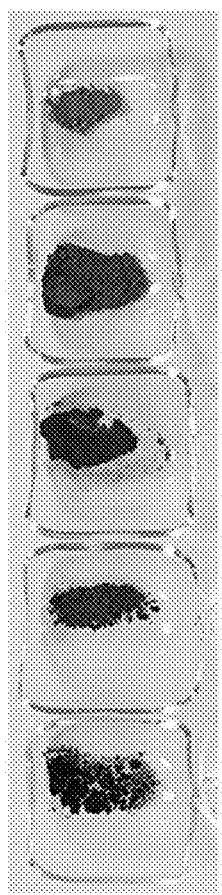
FIG. 6B is a column of optical photographs of the raw materials NiO 600, $Cr_2O_3$ 602, $MnCO_3$ 604, $Co_3O_4$ 606, and $Fe_2O_3$ 608 treated at 850° C. under reducing atmosphere for 30 minutes. The reducing gas stream was 70 vol. % argon (Ar) blended with 30 vol. % $H_2$ and total flow rate of 100 sccm was used.
Figure 6C:
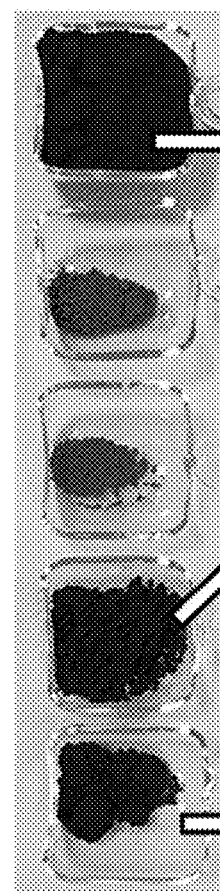
FIG. 6C is a column of optical photographs of the raw materials NiO 600, $Cr_2O_3$ 602, $MnCO_3$ 604, $Co_3O_4$ 606, and $Fe_2O_3$ 608 treated at 850° C. for 5 hours under $CH_4$ atmosphere. The flow rate of $CH_4$ was 100 sccm.
Figure 6D:
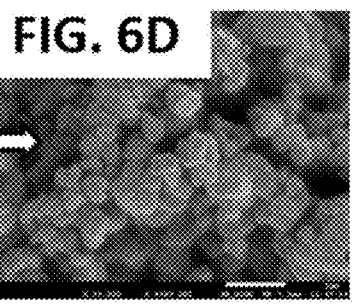
FIG. 6D shows a field emission scanning electron microscopy (FESEM) image of NiO 600 treated at 850° C. for 5 hours under $CH_4$ atmosphere. The flow rate of $CH_4$ was 100 sccm. The scale bar denotes 1 μm.
Figure 6E:
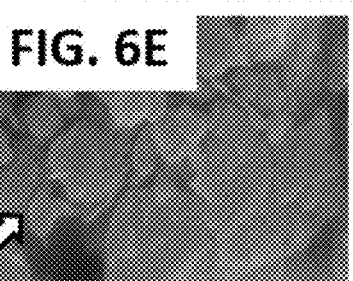
FIG. 6E shows a FESEM image of $Co_3O_4$ 606 treated at 850° C. for 5 hours under $CH_4$ atmosphere. The flow rate of $CH_4$ was 100 sccm. The scale bar denotes 1 μm.
Figure 6F:
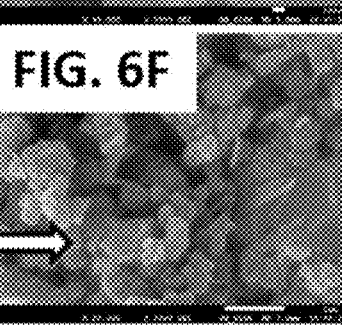
FIG. 6F shows a FESEM image of $Fe_2O_3$ 608 treated at 850° C. for 5 hours under $CH_4$ atmosphere. The flow rate of $CH_4$ was 100 sccm. The scale bar denotes 1 μm.

Optical photos and FESEM images of raw materials NiO, $Cr_2O_3$, $MnCO_3$, $Co_3O_4$, and $Fe_2O_3$ before and after treated at 850° C. under a gaseous environment including 30 vol. % $H_2$ and 70 vol. % argon (Ar), and 100 vol. % $CH_4$ atmosphere, respectively, are shown in FIG. 6A to 6C. The gas flow rates are controlled at 100 sccm. As shown through FIGS. 6A and 6B, NiO, $MnCO_3$, $Co_3O_4$, $Fe_2O_3$, except for $Cr_2O_3$ are reduced in reducing atmosphere preliminarily based on the change of materials' colour, which is consistent with the data in Table 2. Observably, there was no carbon deposited on $MnCO_3$ and $Cr_2O_3$ surface in a study where all of NiO, $Cr_2O_3$, $MnCO_3$, $Co_3O_4$, $Fe_2O_3$ (separately and without further treatment) were directly tested as catalyst for accelerating methane pyrolysis reaction at 850° C. under 100 vol. % $CH_4$ for 5 hours (see FIG. 6C). As shown in FIG. 6D to 6F, the deposited carbon materials are characterized by sphere-type particles.

Figure 7A:
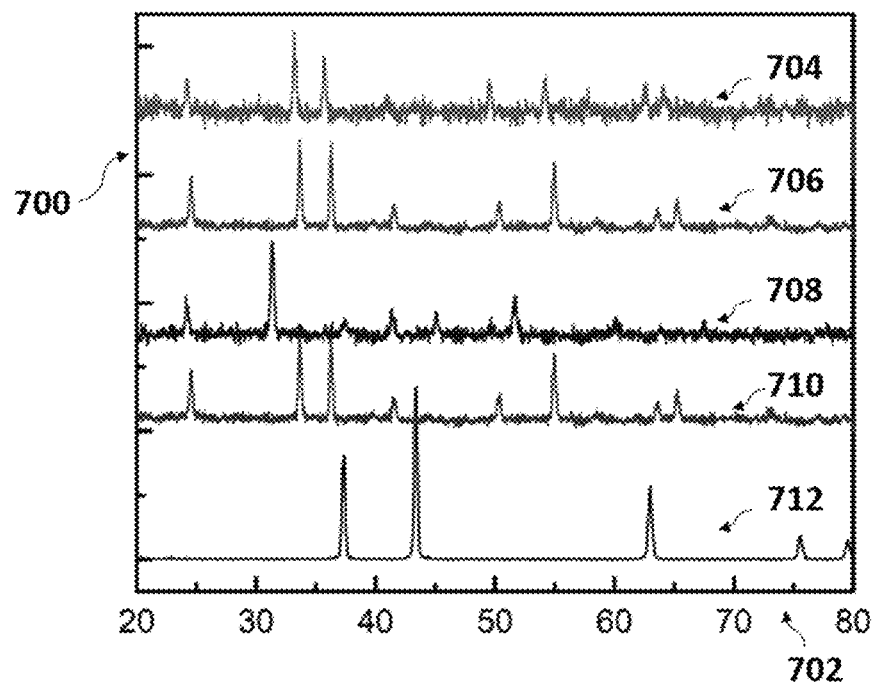
FIG. 7A shows X-ray diffraction (XRD) results of the raw materials NiO 712, $Cr_2O_3$ 710, $MnCO_3$ 708, $Co_3O_4$ 706, and $Fe_2O_3$ 704 treated at 850° C. The vertical axis 700 denotes intensity (in a.u.—arbitrary unit) and the horizontal axis 702 denotes 2θ (in °).
Figure 7B:
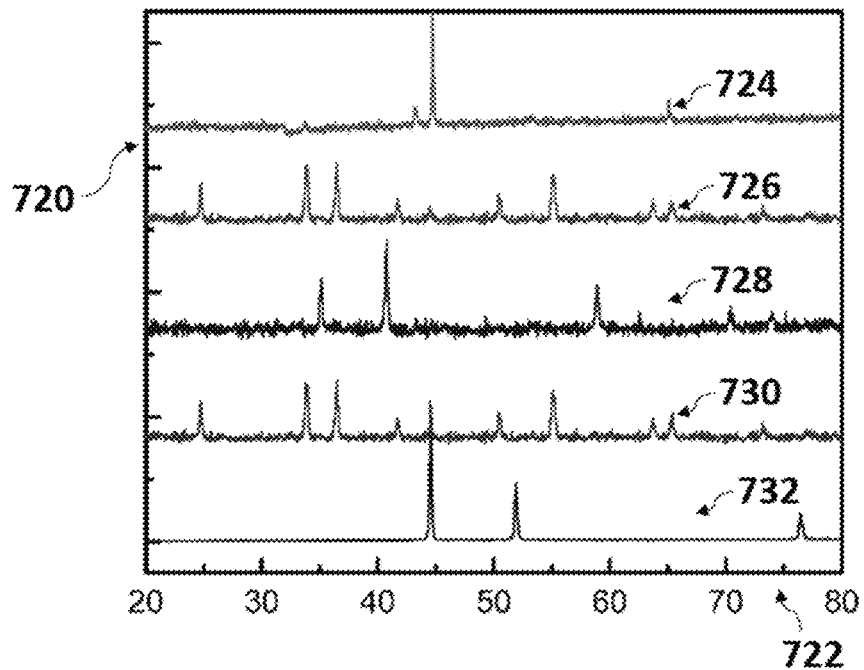
FIG. 7B shows XRD results of the raw materials NiO 732, $Cr_2O_3$ 730, $MnCO_3$ 728, $Co_3O_4$ 726, and $Fe_2O_3$ 724 treated at 850° C. under reducing atmosphere. The reducing gas stream was 70 vol. % argon (Ar) blended with 30 vol. % $H_2$ and total flow rate of 100 sccm was used. The vertical axis 720 denotes intensity (in a.u.—arbitrary unit) and the horizontal axis 722 denotes 2θ (in)°.
Figure 7C:
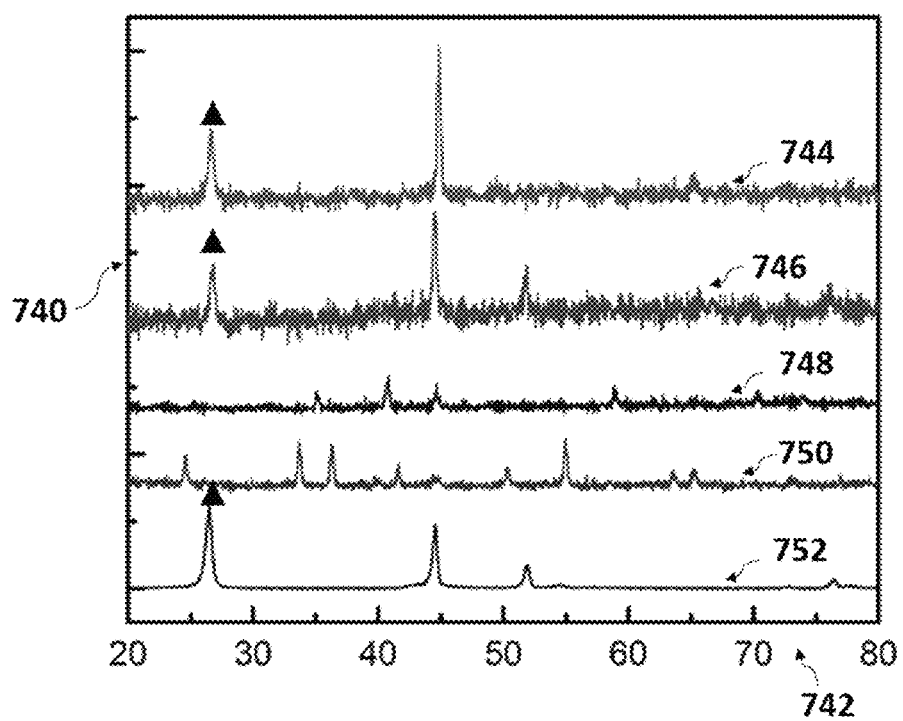
FIG. 7C shows XRD results of the raw materials NiO 752, $Cr_2O_3$ 750, $MnCO_3$ 748, $Co_3O_4$ 746, and $Fe_2O_3$ 744 treated at 850° C. for 5 hours under $CH_4$ atmosphere. The flow rate of $CH_4$ was 100 sccm. The vertical axis 740 denotes intensity (in a.u.—arbitrary unit) and the horizontal axis 742 denotes 2θ (in)°. The diffraction reflection at ~26.4° is attributed to graphite. The symbol "▲" is used to mark out the graphite peak, and the indices of crystal face is (002).

XRD patterns of raw materials NiO, $Cr_2O_3$, $MnCO_3$, $Co_3O_4$, $Fe_2O_3$ treated at 850° C. under reducing gas stream having 70 vol. % Ar mixed with 30 vol. % $H_2$ for 30 mins, and under $CH_4$ atmosphere for 5 hours, are shown in FIG. 7A to 7C, respectively. The flow rate were controlled at 100 sccm. The diffraction reflection at ~26.4° is attributed to graphite in FIG. 7C. The reflection at ~44.5° is attributed to the overlapping peak of C, Co, Ni and Fe. The XRD results are consistent with the result observed from FESEM.

Example 4: Fabrication Synthesis of Composite Catalyst ($Co_3O_4$ Doped with Cr $Co_3O_4$ is mixed with chromium oxide ($Cr_2O_3$) with the different metal atomic ratio (see column under "sample formula" in Table 3 below). In this example, chromium oxide is the precursor (i.e. dopant precursor) for chromium as the catalytic transition metal in the present composite catalyst. The two raw materials are added together with ~150 g of zirconia balls as rolling media and about 45 g to about 60 g of isopropanol as solvent in a plastic bottle. The bottles were put on the rolling machine for about 20 to 24 hours. Once done the mixture was filtered then dried in an oven at ~80° C. for overnight. After drying the mixed powders were grinded using mortar and pestle and calcined, and the stability was investigated under reducing atmosphere and to observe the catalytic performance. The experimental weight loss percentage in $H_2$ atmosphere was calculated based on the weight of catalyst before/after treated in 70 vol. % Ar mixed with 30 vol. % $H_2$ for 30 mins at 850° C.

with decreasing doping level. Nearly or substantially spherical particles are observed when the cobalt doping level was one-sixth of the total mole of Co and Ni in the composite catalyst sample of $Co_1Ni_5$.

Figure 9A:
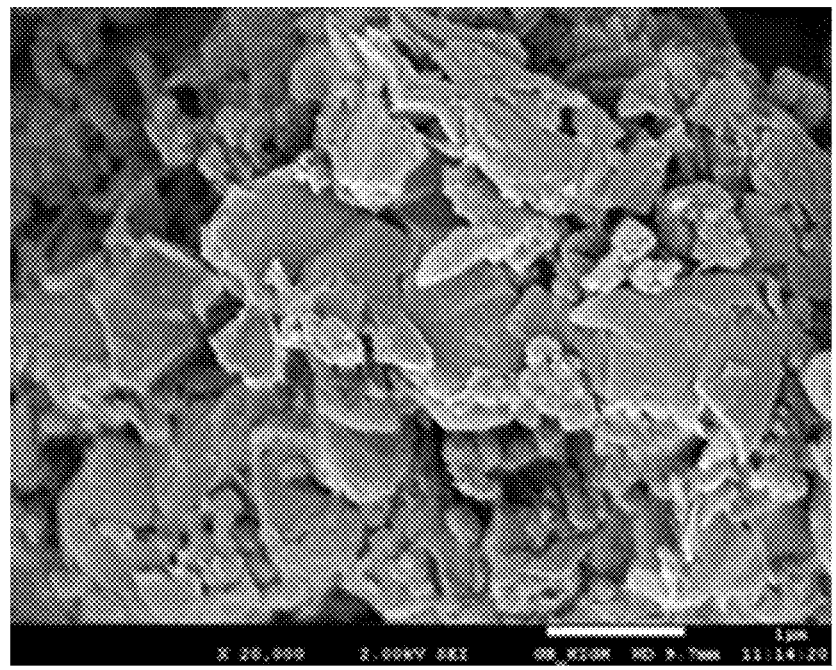
FIG. 9A shows a FESEM image of carbon deposited on a composite catalyst of the present disclosure, wherein the composite catalyst is based on the cobalt and nickel treated at 850° C. for 5 hours in $CH_4$ atmosphere. The feedstock was $CH_4$ and total flow rate of 100 sccm. The sample name corresponds to $Co_5Ni_1$ in table 4. Scale bar denotes 1 μm.
Figure 9B:
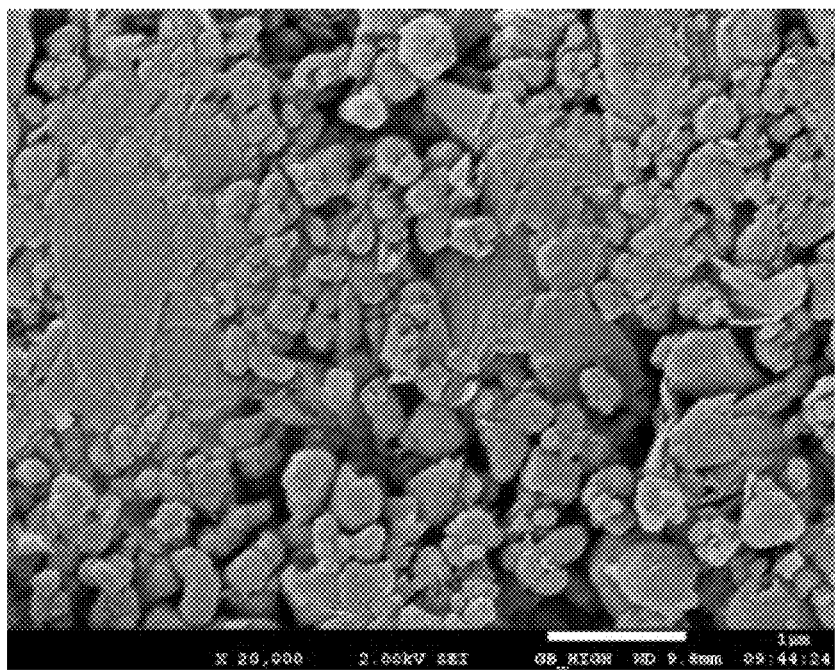
FIG. 9B shows a FESEM image of carbon deposited on a composite catalyst of the present disclosure, wherein the composite catalyst is based on the cobalt and nickel to treated at 850° C. for 5 hours in $CH_4$ atmosphere. The feedstock was $CH_4$ and total flow rate of 100 sccm. The sample name corresponds to $Co_4Ni_2$ in table 4. Scale bar denotes 1 μm.
Figure 9C:
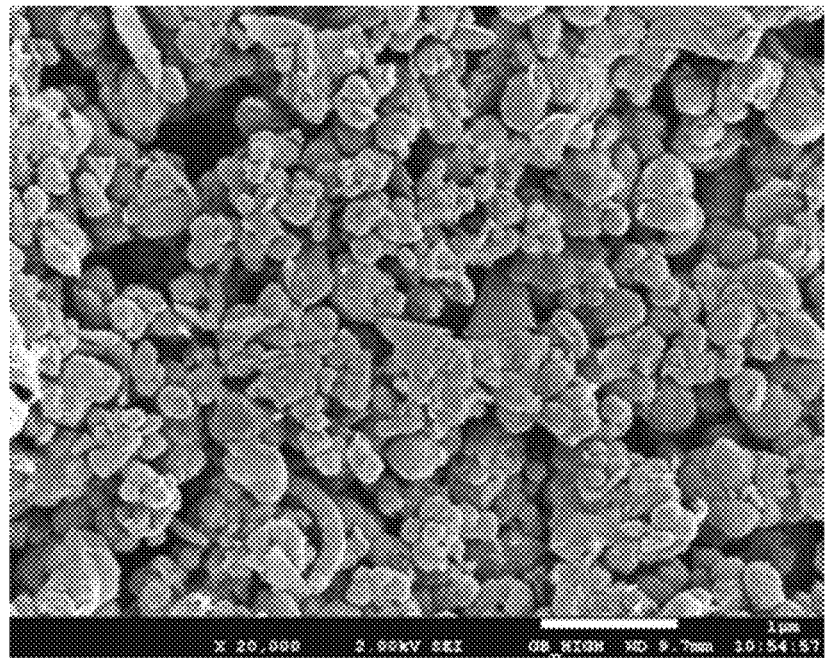
FIG. 9C shows a FESEM image of carbon deposited on a composite catalyst of the present disclosure, wherein the composite catalyst is based on the cobalt and nickel treated at 850° C. for 5 hours in $CH_4$ atmosphere. The feedstock was $CH_4$ and total flow rate of 100 sccm. The sample name corresponds to $Co_3Ni_3$ in table 4. Scale bar denotes 1 μm.
Figure 9D:
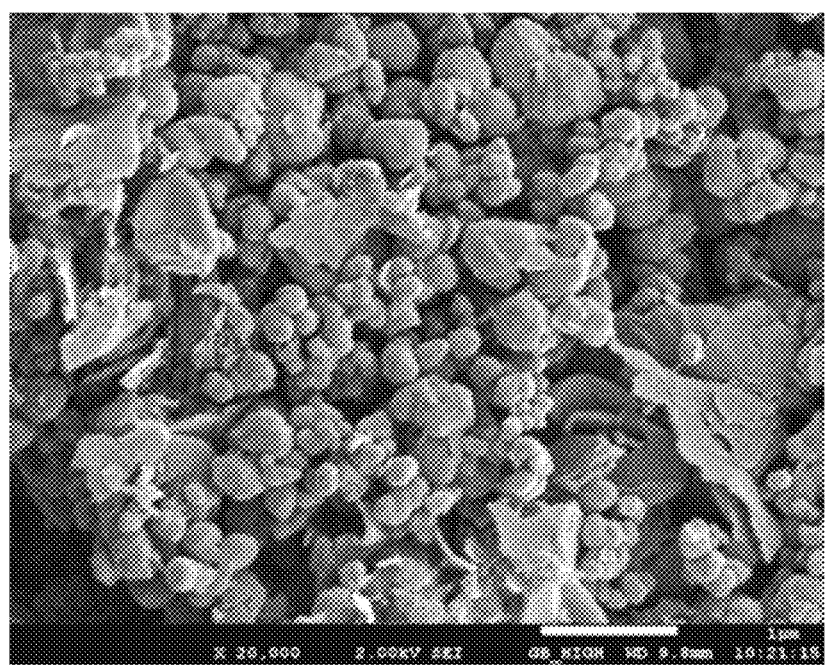
FIG. 9D shows a FESEM image of carbon deposited on a composite catalyst of the present disclosure, wherein the composite catalyst is based on the cobalt and nickel treated at 850° C. for 5 hours in $CH_4$ atmosphere. The feedstock was $CH_4$ and total flow rate of 100 sccm. The sample name corresponds to $Co_2Ni_4$ in table 4. Scale bar denotes 1 μm.
Figure 9E:
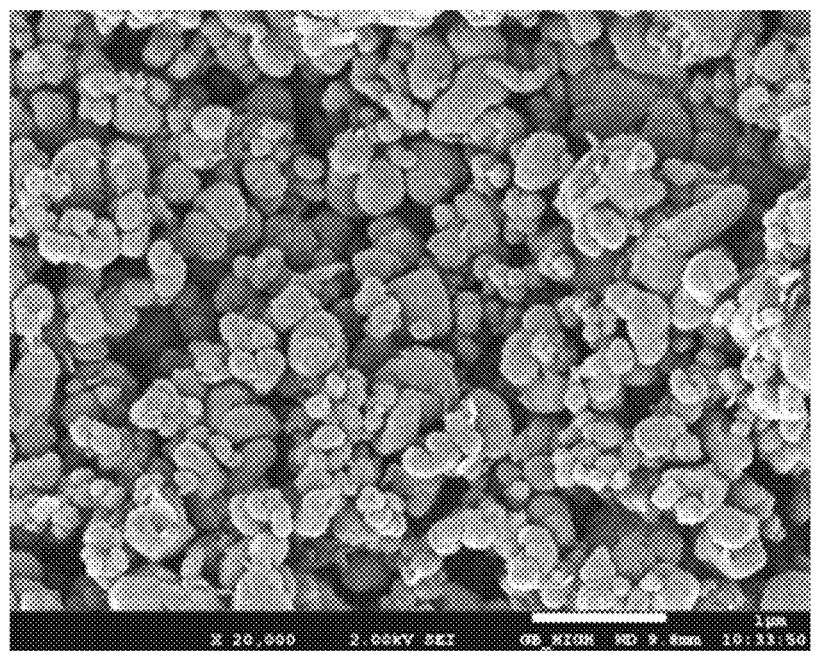
FIG. 9E shows a FESEM image of carbon deposited on a composite catalyst of the present disclosure, wherein the composite catalyst is based on the cobalt and nickel treated at 850° C. for 5 hours in $CH_4$ atmosphere. The feedstock was $CH_4$ and total flow rate of 100 sccm. The sample name corresponds to $Co_1Ni_5$ in table 4. Scale bar denotes 1 μm.
Figure 9F:
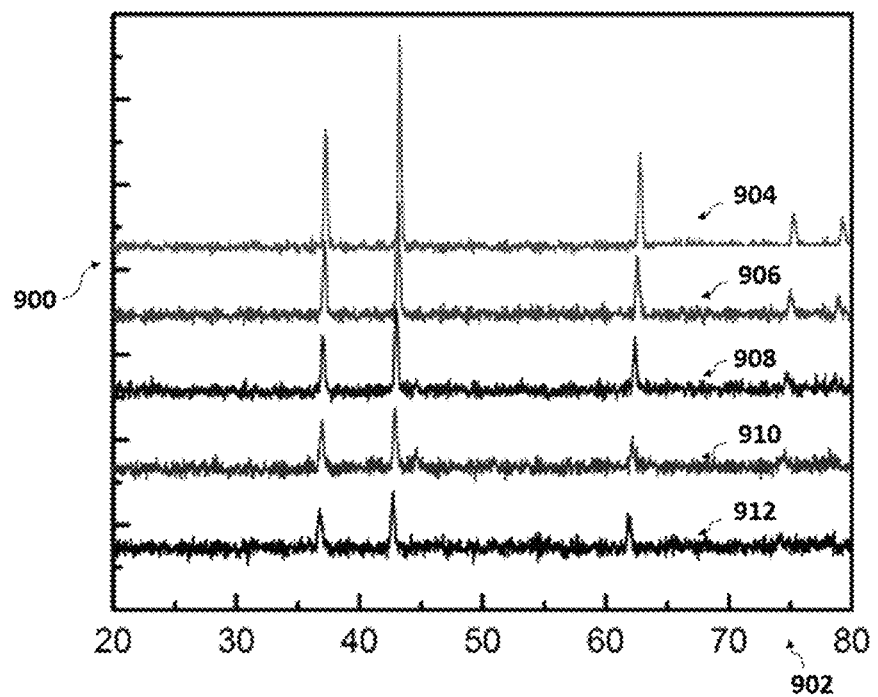
FIG. 9F shows XRD results of the present composite catalyst of various samples based on cobalt oxide doped with nickel metal (in this instance the precursor used for doping the nickel metal is NiO) calcined at 900° C. for 6 hours in static air. 904, 906, 908, 910, 912 correspond to sample $Co_1Ni_5$, $Co_2Ni_4$, $Co_3Ni_3$, $Co_4Ni_2$, $Co_5Ni_1$, respectively (see table 4). The vertical axis 900 denotes intensity (in a.u.—arbitrary unit) and the horizontal axis 902 denotes 2θ (in)°.
Figure 9G:
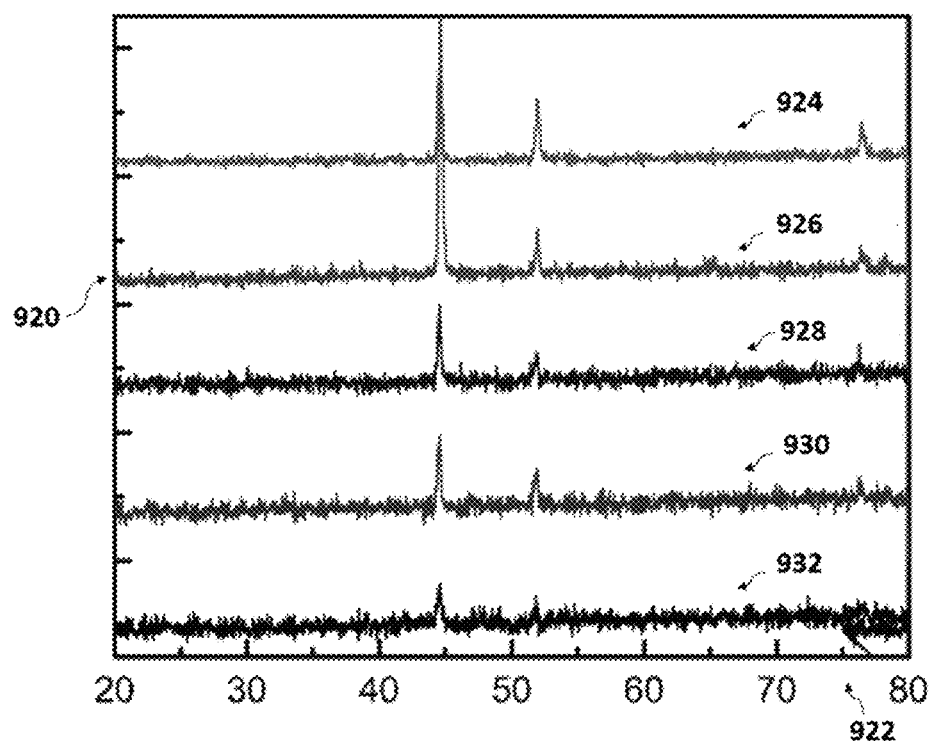
FIG. 9G shows XRD results of the present composite catalyst of various samples based on cobalt oxide doped with nickel metal (in this instance the precursor used for doping the nickel metal is NiO) treated under reducing gas stream having 70 vol. % Ar blended with 30 vol. % Hz. The flow rate of gas was set at 100 sccm. 924, 926, 928, 930, 932, correspond to sample $Co_1Ni_5$, $Co_2Ni_4$, $Co_3Ni_3$, $Co_4Ni_2$, $Co_5Ni_1$, respectively (see table 4). The vertical axis 920 denotes intensity (in a.u.—arbitrary unit) and the horizontal axis 922 denotes 2θ (in)°.
Figure 9H:
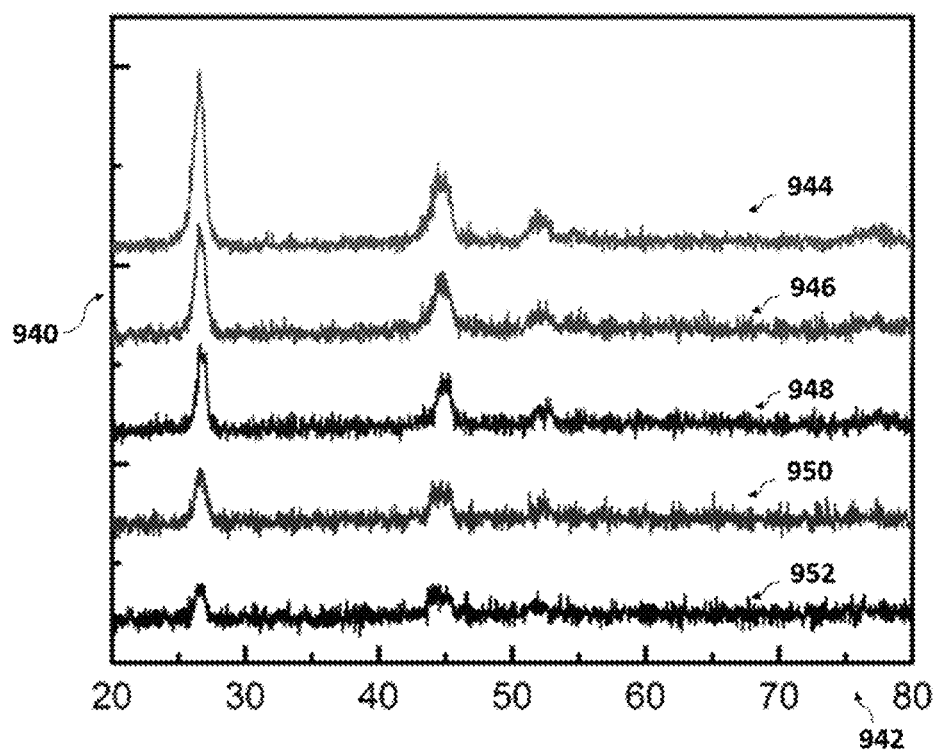
FIG. 9H shows XRD results of the present composite catalyst of various samples based on cobalt oxide doped with nickel metal (in this instance the precursor used for doping the nickel metal is NiO) treated at 850° C. for 5 hours under $CH_4$ atmosphere. The flow rate of gas was set 100 sccm. 944, 946, 948, 950, 952 correspond to sample $Co_1Ni_5$, $Co_2Ni_4$, $Co_3Ni_3$, $Co_4Ni_2$, $Co_5Ni_1$, respectively (see table 4). The vertical axis 940 denotes intensity (in a.u.—arbitrary unit) and the horizontal axis 942 denotes 2θ (in)°.

XRD results of the samples treated at different condition are shown in FIG. 9F to 9H. As shown in FIG. 9F, only spinel phase is detected in samples calcined at 900° C. for 6 hours, which meant the solubility of cobalt in NiO is high, or nickel oxide and cobalt oxide are mutually soluble. The

TABLE 3

Weight Change of Present Composite Catalyst

Figure 8A:
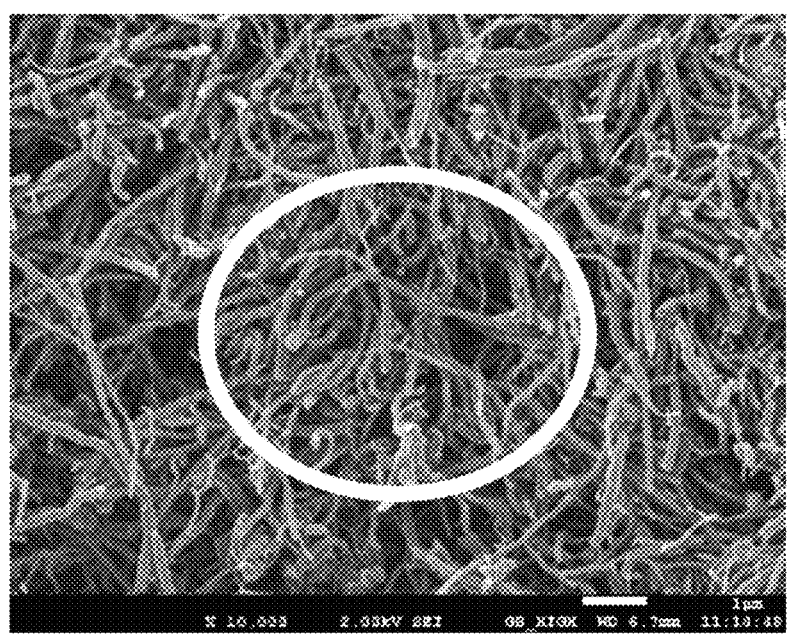
FIG. 8A shows a FESEM image of carbon deposited over $Co_3Cr_3$ catalyst (see sample name in table 3) at 850° C. for 5 hours in $CH_4$ atmosphere. The feedstock gas was $CH_4$ and total flow rate of 100 sccm. Scale bar denotes 1 μm.
Figure 8B:
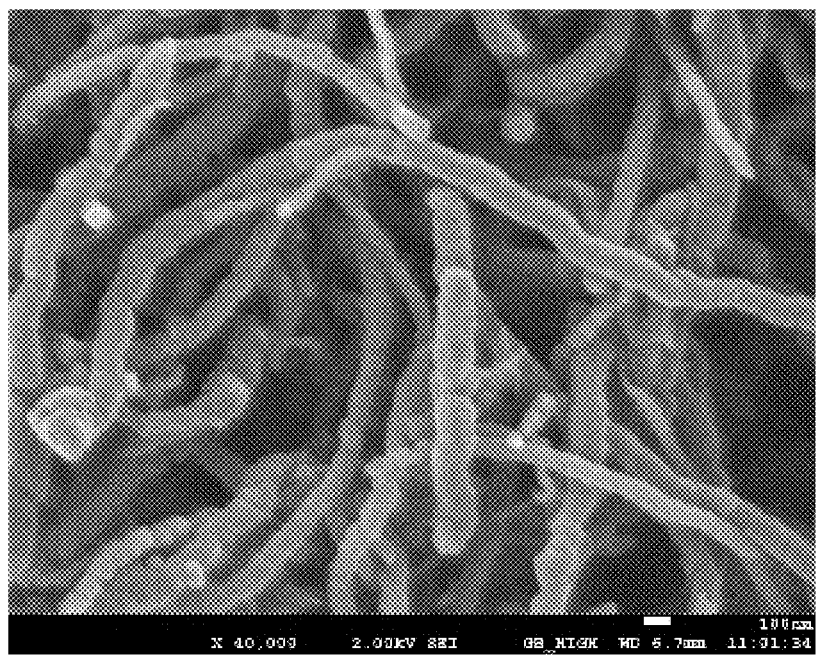
FIG. 8B shows a magnified FESEM image of the circled area in FIG. 8A. Scale bar denotes 100 nm.
Figure 8C:
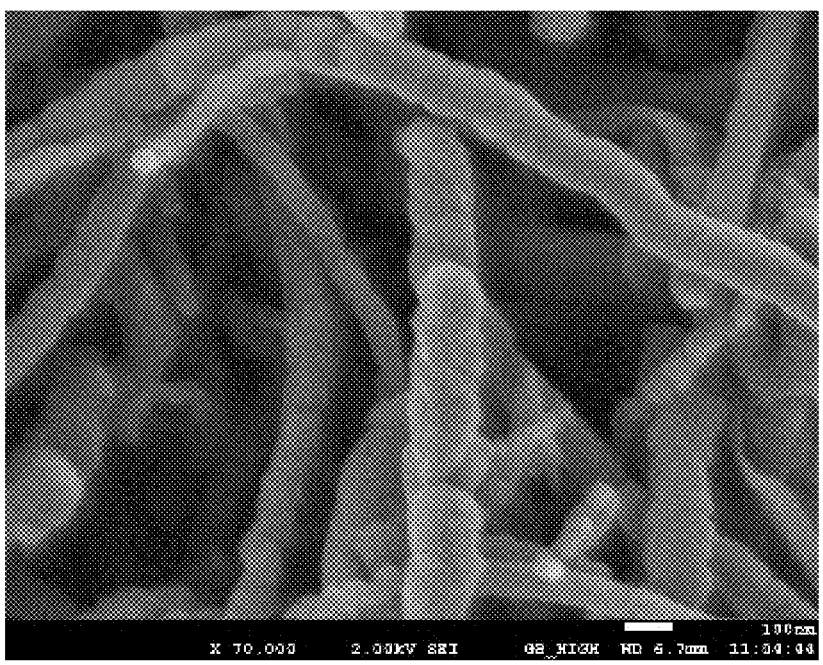
FIG. 8C shows a further magnified FESEM image of the circled area in FIG. 8A. Scale bar denotes 100 nm.

| Sample formula | Denoted Name | Theoretical weight loss after full reduction/(%) | Experimental weight loss in $H_2$ atmosphere/(%) | Carbon yield/ (g C/$g_{cata.}$) |
|---|---|---|---|---|
| $(Co_{2.5}Cr_{0.5})O_4$ | $Co_5Cr_1$ | 26.96 | 18.77 | 3.31 |
| $(Co_{2.0}Cr_{1.0})O_4$ | $Co_4Cr_2$ | 27.37 | 10.49 | 2.54 |
| $(Co_{1.5}Cr_{1.5})O_4$ | $Co_3Cr_3$ (FIG. 8A to 8C) | 27.78 | 4.10 | 2.21 |
| $(Co_{1.0}Cr_{2.0})O_4$ | $Co_2Cr_4$ | 28.20 | 0.36 | 1.57 |
| $(Co_{0.5}Cr_{2.5})O_4$ | $Co_1Cr_5$ | 28.64 | 0.21 | 0.75 |

Example 5: Fabrication Synthesis of Composite Catalyst ($Co_3O_4$ Doped with Ni)

$Co_3O_4$ is mixed with nickel oxide (NiO) with the different metal atomic ratio (see column under "sample formula" in Table 4 below). In this example, nickel oxide is the precursor (i.e. dopant precursor) for nickel as the catalytic transition metal in the present composite catalyst. The two raw materials are added together with ~150 g of zirconia balls as rolling media and about 45 g to about 60 g of isopropanol as solvent in a plastic bottle. The bottles were put on the rolling machine for about 20 to 24 hours. Once done the mixture was filtered then dried in an oven at ~80° C. for overnight. After drying the mixed powders were grinded using mortar and pestle and calcined, investigated the stability under reducing atmosphere, conducted the catalytic performance. The experimental weight loss percentage in $H_2$ atmosphere was calculated based on the weight of catalyst before/after treated in 70 vol. % Ar mixed with 30 vol. % $H_2$ for 30 mins at 850° C.

diffraction reflection at ~26.4° is attributed to graphite (see FIG. 9H), and the intensity of diffraction peak increased with the decreasing in doping level, which meant carbon materials yield also increased with the decrease in doping level. The reflection at ~44.5° is attributed to the overlapping peak of C, Co, Ni. The XRD results are consistent with the result observed via FESEM.

Example 6: Fabrication Synthesis of Composite Catalyst ($Fe_2O_3$ Doped with Ni)

$Fe_2O_3$ is mixed with nickel oxide (NiO) with the different metal atomic ratio (see column under "sample formula" in Table 5 below). In this example, nickel oxide is the precursor (i.e. dopant precursor) for nickel as the catalytic transition metal in the present composite catalyst. The weight change of iron doped NiO based catalyst is shown in Table 5 below. As listed in Table 5, the experiment weight loss of the present composite catalyst is slightly lower than that of theoretical calculation value under a reducing atmosphere.

TABLE 4

Weight Change of Present Composite Catalyst

| Sample formula | Denoted Name | Theoretical weight loss after full reduction/(%) | Experimental weight loss in $H_2$ atmosphere/(%) | Carbon yield/ (g C/$g_{cata.}$) |
|---|---|---|---|---|
| $(Co_{2.5}Ni_{0.5})O_4$ | $Co_5Ni_1$ (FIG. 9A) | 26.59 | 21.92 | 3.16 |
| $(Co_{2.0}Ni_{1.0})O_4$ | $Co_4Ni_2$ (FIG. 9B) | 26.60 | 21.78 | 4.74 |
| $(Co_{1.5}Ni_{1.5})O_4$ | $Co_3Ni_3$ (FIG. 9C) | 26.62 | 21.48 | 5.96 |
| $(Co_{1.0}Ni_{2.0})O_4$ | $Co_2Ni_4$ (FIG. 9D) | 26.63 | 21.38 | 6.74 |
| $(Co_{0.5}Ni_{2.5})O_4$ | $Co_1Ni_5$ (FIG. 9E) | 26.64 | 21.41 | 8.34 |

FESEM images of various samples based on cobalt oxide doped with nickel (in this instance using NiO) treated at 850° C. under pure $CH_4$ atmosphere for 5 hours are shown in FIG. 9A to 9E. As shown in FIG. 9A to 9E, the deposited carbon materials are characterized by sphere-type particles. The interesting finding is that the spherical carbon increased The carbon yield increased with increase in doping level. This may indicate that nickel as the base catalyst absorb most of the carbon and the promoter only alter the activity of the catalyst.

The maximum carbon yield of sample treated in pure $CH_4$ at 850° C. for 5 hours is up to 7.81 g C/$g_{cata.}$, which is slightly lower than the cobalt dopant but still higher than 5.37 g C/g$_{cata.}$ of just the pristine catalyst, NiO (compare to Table 2).

(i.e. dopant precursor) for nickel as the catalytic transition metal in the present composite catalyst. The weight change of chromium doped NiO based catalyst is shown in Table 6

TABLE 5

Weight Change of Present Composite Catalyst

Figure 10A:
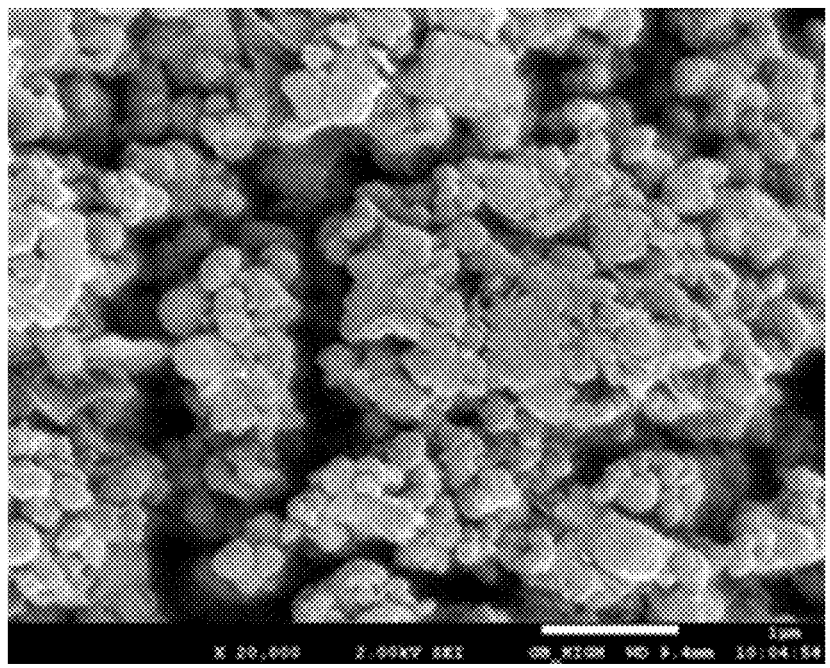
FIG. 10A shows a FESEM image of carbon deposited on a composite catalyst of the present disclosure, wherein the composite catalyst is based on the iron and nickel treated at 850° C. for 5 hours in $CH_4$ atmosphere. The feedstock was $CH_4$ and total flow rate of 100 sccm. The sample name corresponds to $Fe_5Ni_1$ in table 5. Scale bar denotes 1 μm.
Figure 10B:
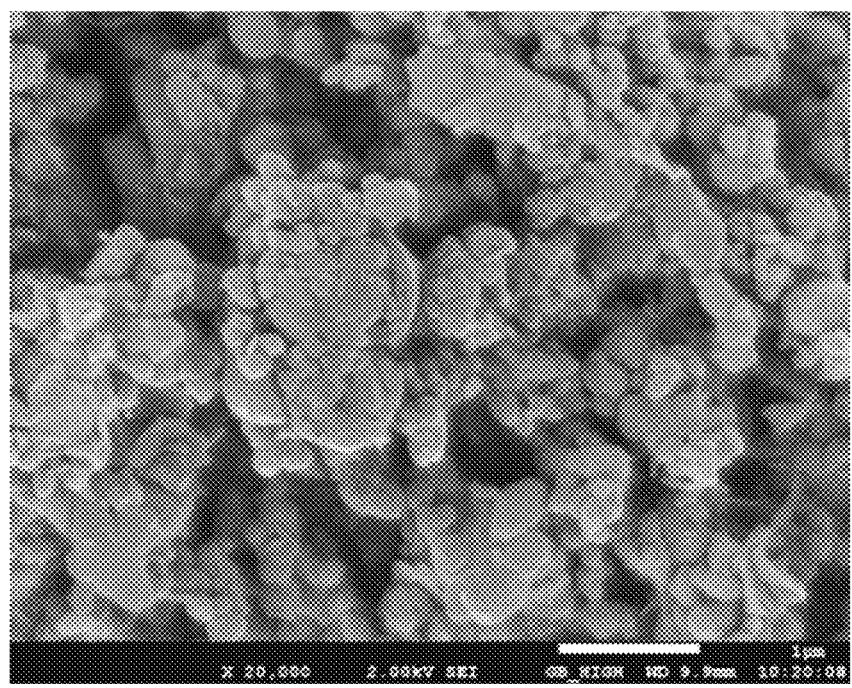
FIG. 10B shows a FESEM image of carbon deposited on a composite catalyst of the present disclosure, wherein the composite catalyst is based on the iron and nickel treated at 850° C. for 5 hours in $CH_4$ atmosphere. The feedstock was $CH_4$ and total flow rate of 100 sccm. The sample name corresponds to $Fe_4Ni_2$ in table 5. Scale bar denotes 1 μm.
Figure 10C:
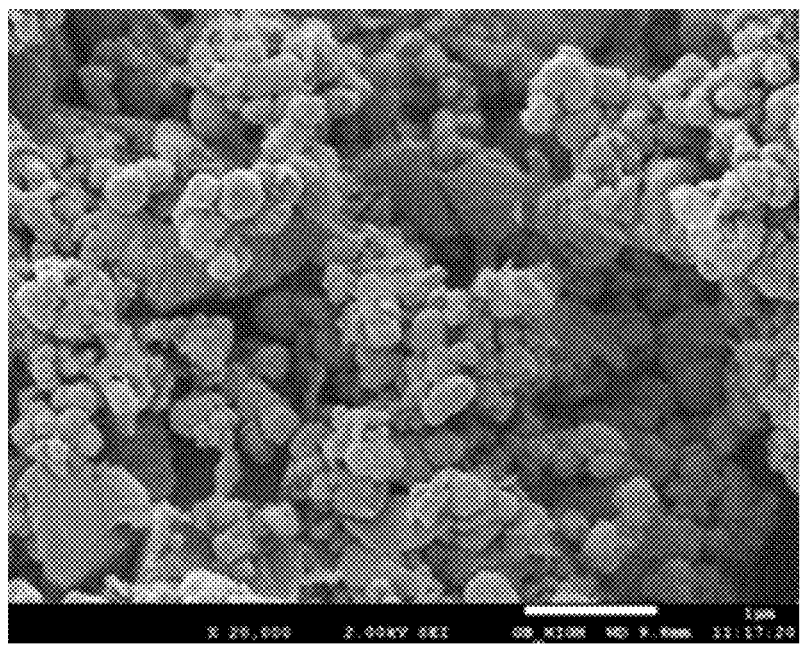
FIG. 10C shows a FESEM image of carbon deposited on a composite catalyst of the present disclosure, wherein the composite catalyst is based on the iron and nickel treated at 850° C. for 5 hours in $CH_4$ atmosphere. The feedstock was $CH_4$ and total flow rate of 100 sccm. The sample name corresponds to $Fe_3Ni_3$ in table 5. Scale bar denotes 1 μm.
Figure 10D:
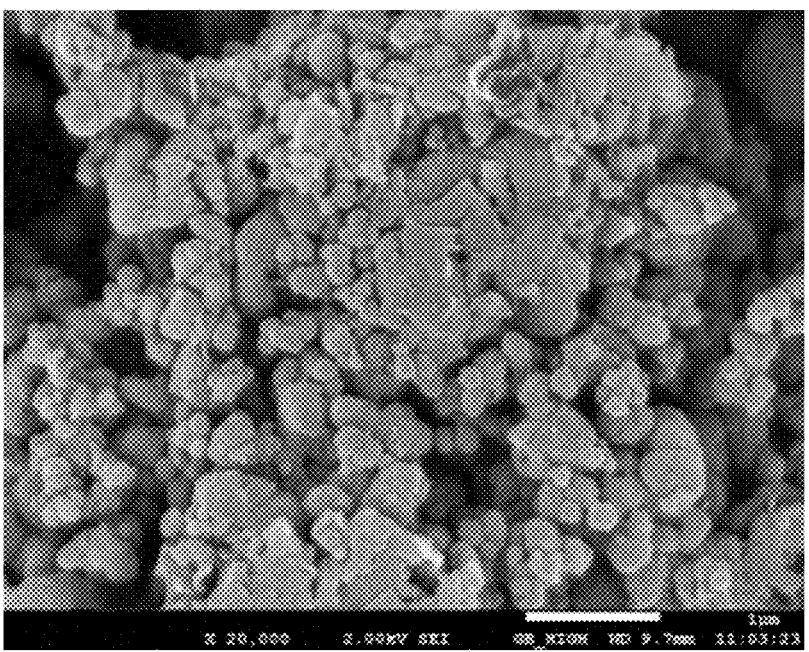
FIG. 10D shows a FESEM image of carbon deposited on a composite catalyst of the present disclosure, wherein the composite catalyst is based on the iron and nickel treated at 850° C. for 5 hours in $CH_4$ atmosphere. The feedstock was $CH_4$ and total flow rate of 100 sccm. The sample name corresponds to $Fe_2Ni_4$ in table 5. Scale bar denotes 1 μm.
Figure 10E:
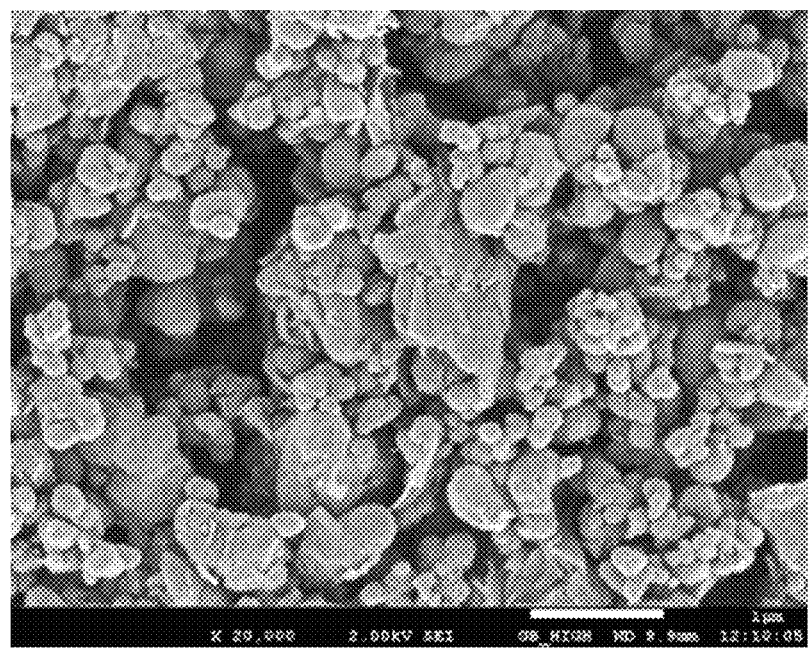
FIG. 10E shows a FESEM image of carbon deposited on a composite catalyst of the present disclosure, wherein the composite catalyst is based on the iron and nickel treated at 850° C. for 5 hours in $CH_4$ atmosphere. The feedstock was $CH_4$ and total flow rate of 100 sccm. The sample name corresponds to $Fe_1Ni_5$ in table 5. Scale bar denotes 1 μm.

| Sample formula | Denoted Name | Theoretical weight loss after full reduction/(%) | Experimental weight loss in H$_2$ atmosphere/(%) | Carbon yield/ (g C/g$_{cata.}$) |
|---|---|---|---|---|
| (Fe$_{2.5}$Ni$_{0.5}$)O$_4$ | Fe$_5$Ni$_1$ (FIG. 10A) | 27.47 | 27.42 | 2.49 |
| (Fe$_{2.0}$Ni$_{1.0}$)O$_4$ | Fe$_4$Ni$_2$ (FIG. 10B) | 27.31 | 27.36 | 2.39 |
| (Fe$_{1.5}$Ni$_{1.5}$)O$_4$ | Fe$_3$Ni$_3$ (FIG. 10C) | 27.14 | 26.35 | 6.57 |
| (Fe$_{1.0}$Ni$_{2.0}$)O$_4$ | Fe$_2$Ni$_4$ (FIG. 10D) | 26.98 | 25.19 | 6.88 |
| (Fe$_{0.5}$Ni$_{2.5}$)O$_4$ | Fe$_1$Ni$_5$ (FIG. 10E) | 26.82 | 23.30 | 7.81 |

FESEM images of iron oxide doped with nickel samples after treated at 850° C. under pure CH$_4$ atmosphere for 5 hours are shown in FIG. 10A to 10E. As shown in FIG. 10A to 10E, the deposited carbon materials are characterized by sphere-type particles. The interesting finding is that the spherical carbon increased with decreasing doping level. Nearly or substantially spherical particles are observed when the cobalt doping level was one-sixth of the total mole of Fe and Ni in the composite catalyst sample of Fe$_1$Ni$_5$.

Figure 10F:
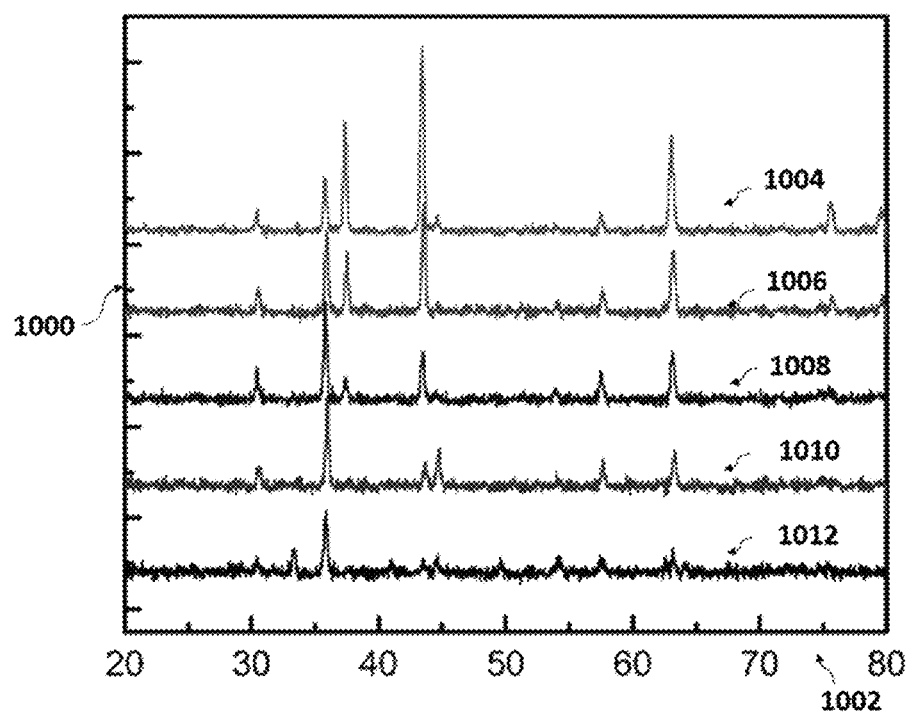
FIG. 10F shows XRD results of the present composite catalyst of various samples based on iron oxide doped with nickel metal (in this instance the precursor used for doping the nickel metal is NiO) calcined at 900° C. for 6 hours in static air. 1004, 1006, 1008, 1010, 1012 correspond to sample $Fe_1Ni_5$, $Fe_2Ni_4$, $Fe_3Ni_3$, $Fe_4Ni_2$, $Fe_5Ni_1$, respectively (see table 5). The vertical axis 1000 denotes intensity (in a.u.—arbitrary unit) and the horizontal axis 1002 denotes 2θ (in)°.
Figure 10G:
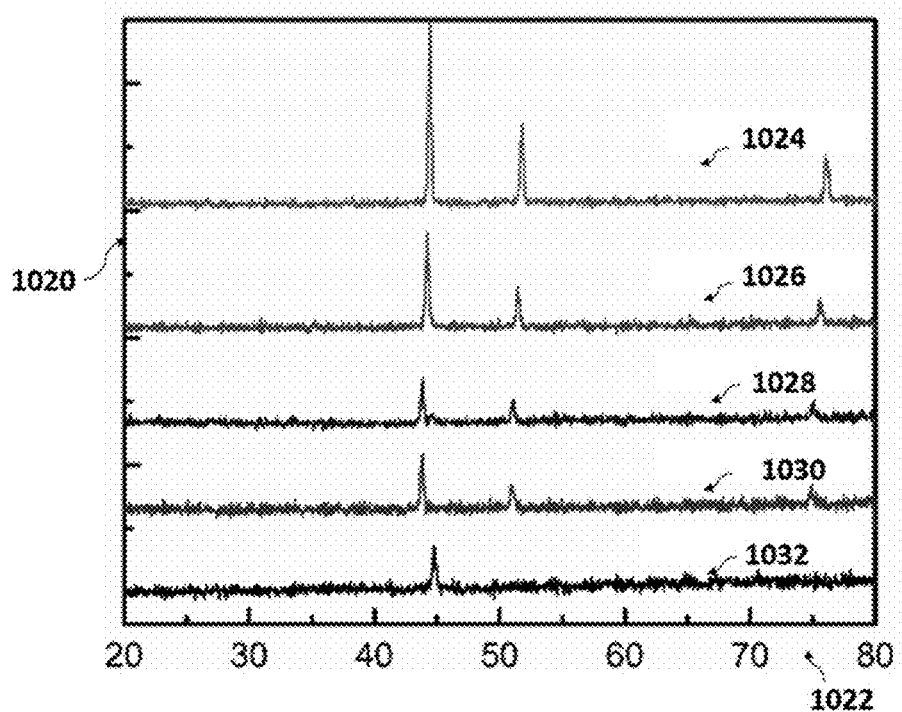
FIG. 10G shows XRD results of the present composite catalyst of various samples based on iron oxide doped with nickel metal (in this instance the precursor used for doping the nickel metal is NiO) treated under reducing gas stream having 70 vol. % Ar blended with 30 vol. % $H_2$. The flow rate of gas was set at 100 sccm. 1024, 1026, 1028, 1030, 1032, correspond to sample $Fe_1Ni_5$, $Fe_2Ni_4$, $Fe_3Ni_3$, $Fe_4Ni_2$, $Fe_5Ni_1$, respectively (see table 5). The vertical axis 1020 denotes intensity (in a.u.—arbitrary unit) and the horizontal axis 1022 denotes 2θ (in)°.
Figure 10H:
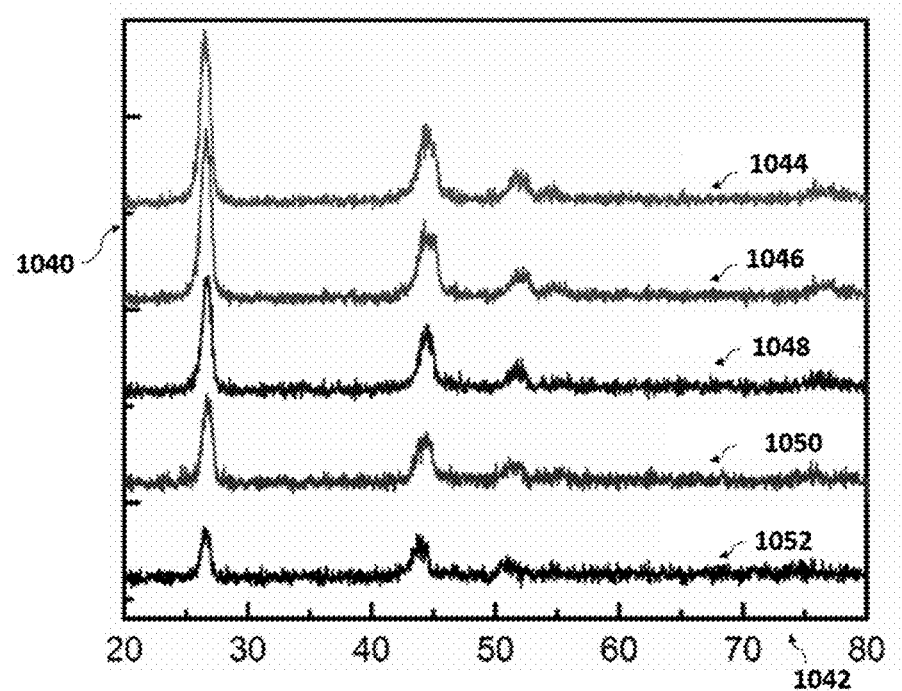
FIG. 10H shows XRD results of the present composite catalyst of various samples based on iron oxide doped with nickel metal (in this instance the precursor used for doping the nickel metal is NiO) treated at 850° C. for 5 hours under $CH_4$ atmosphere. The flow rate of gas was set 100 sccm. 1044, 1046, 1048, 1050, 1052 correspond to sample $Fe_1Ni_5$, $Fe_2Ni_4$, $Fe_3Ni_3$, $Fe_4Ni_2$, $Fe_5Ni_1$, respectively (see table 5). The vertical axis 1040 denotes intensity (in a.u.—arbitrary unit) and the horizontal axis 1042 denotes 2θ (in)°.

XRD results of the samples treated at different condition are shown in FIG. 10F to 10H. As shown in FIG. 10F, second phase is detected in samples calcined at 900° C. for 6 hours, which meant the solubility of nickel oxide in iron oxide is lower. The diffraction reflection at ~26.4° is attributed to graphite (see FIG. 10H), and the intensity of diffraction peak increased with the decreasing in doping level, which meant carbon materials yield also increased with the increase in doping level. The reflection at ~44.5° is attributed to the overlapping peak of C, Fe, Ni. The XRD results are consistent with the result observed via FESEM.

Example 7: Fabrication Synthesis of Composite Catalyst (Cr$_2$O$_3$ Doped with Ni)

Cr$_2$O$_3$ is mixed with nickel oxide (NiO) with the different metal atomic ratio (see column under "sample formula" in Table 6 below). In this example, nickel oxide is the precursor below. The experiment weight loss of catalysts is lower than that of theoretical calculation value under reducing atmosphere. The carbon yield increased with the increasing of the dopant material. The optimum carbon value is higher than 5.37 g C/g$_{cata.}$ of pristine catalyst, NiO.

TABLE 6

Weight Change of Present Composite Catalyst

Figure 11A:
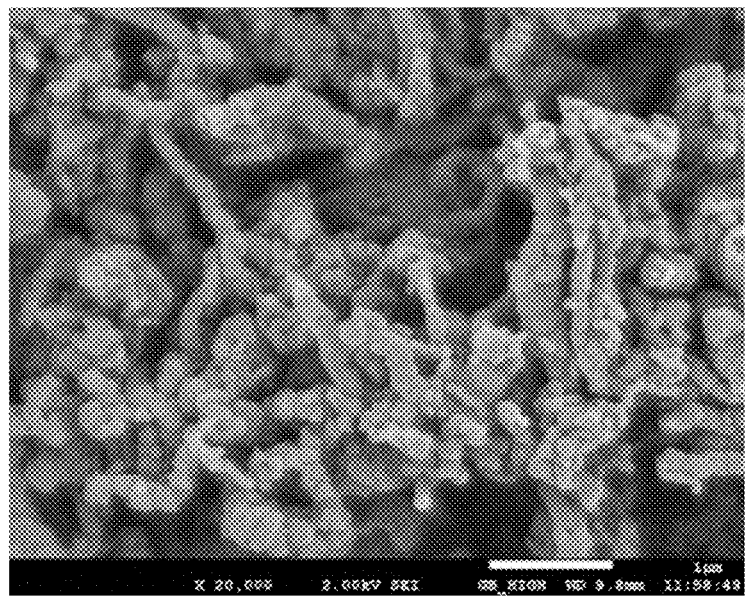
FIG. 11A shows a FESEM image of carbon deposited on a composite catalyst of the present disclosure, wherein the composite catalyst is based on the chromium and nickel treated at 850° C. for 5 hours in $CH_4$ atmosphere. The feedstock was $CH_4$ and total flow rate of 100 sccm. The sample name corresponds to $Cr_5N_1$ in table 6. Scale bar denotes 1 μm.
Figure 11B:
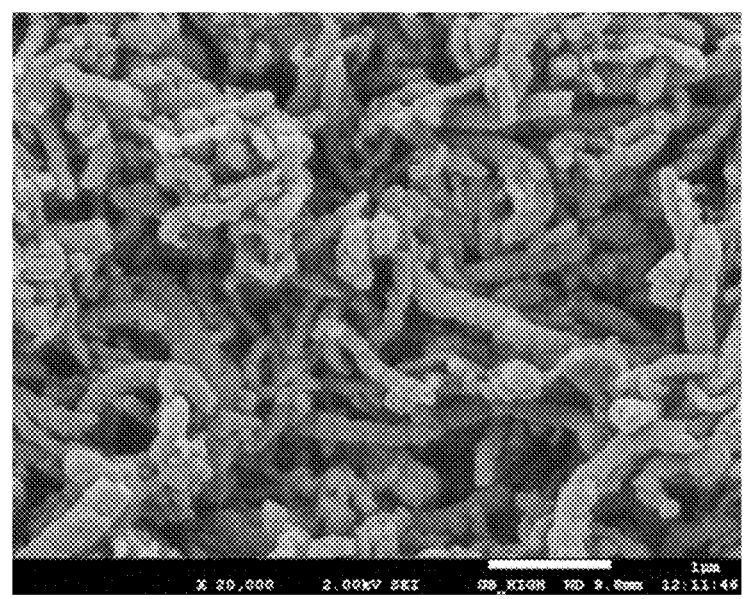
FIG. 11B shows a FESEM image of carbon deposited on a composite catalyst of the present disclosure, wherein the composite catalyst is based on the chromium and nickel treated at 850° C. for 5 hours in $CH_4$ atmosphere. The feedstock was $CH_4$ and total flow rate of 100 sccm. The sample name corresponds to $Cr_4Ni_2$ in table 6. Scale bar denotes 1 μm.
Figure 11C:
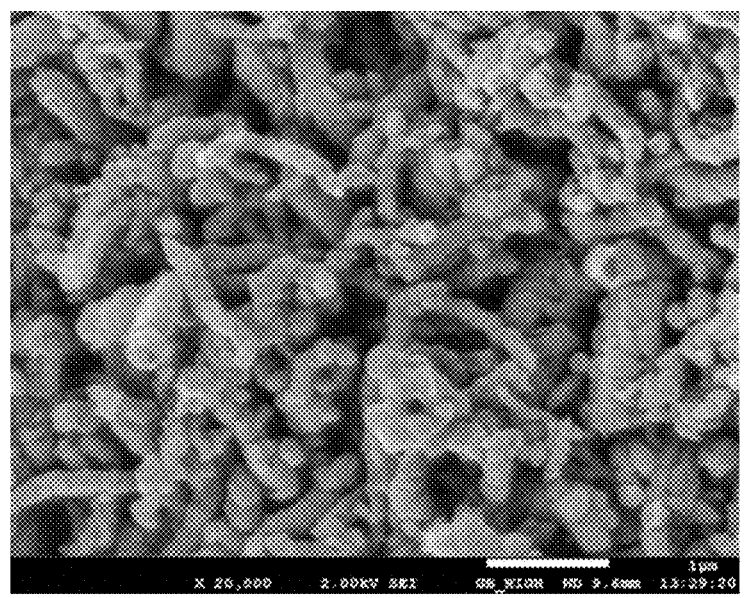
FIG. 11C shows a FESEM image of carbon deposited on a composite catalyst of the present disclosure, wherein the composite catalyst is based on the chromium and nickel treated at 850° C. for 5 hours in $CH_4$ atmosphere. The feedstock was $CH_4$ and total flow rate of 100 sccm. The sample name corresponds to $Cr_3Ni_3$ in table 6. Scale bar denotes 1 μm.
Figure 11D:
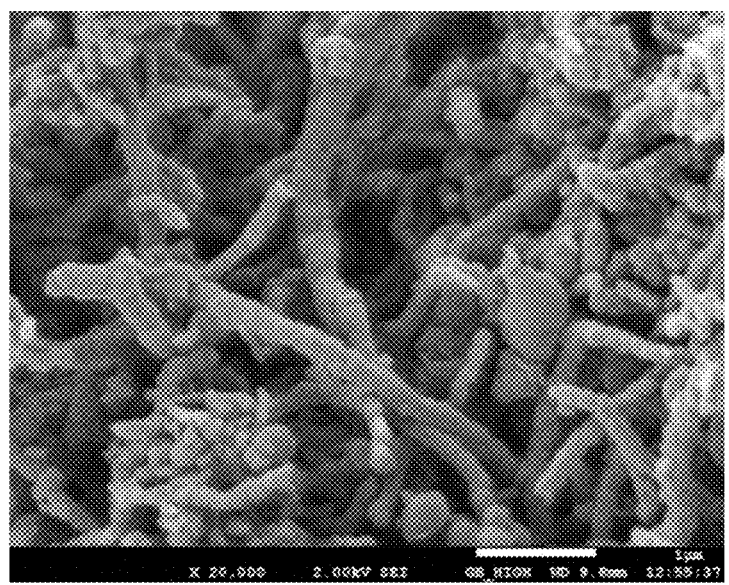
FIG. 11D shows a FESEM image of carbon deposited on a composite catalyst of the present disclosure, wherein the composite catalyst is based on the chromium and nickel treated at 850° C. for 5 hours in $CH_4$ atmosphere. The feedstock was $CH_4$ and total flow rate of 100 sccm. The sample name corresponds to $Cr_2Ni_4$ in table 6. Scale bar denotes 1 μm.
Figure 11E:
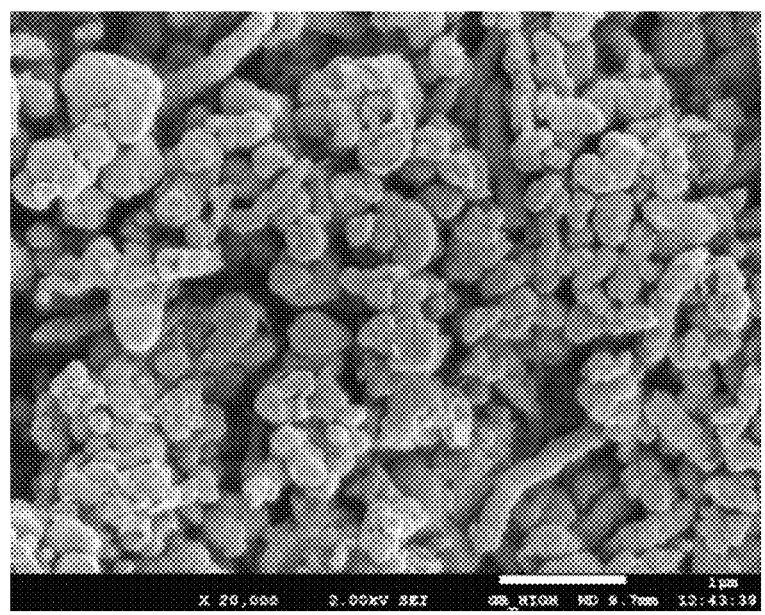
FIG. 11E shows a FESEM image of carbon deposited on a composite catalyst of the present disclosure, wherein the composite catalyst is based on the chromium and nickel treated at 850° C. for 5 hours in $CH_4$ atmosphere. The feedstock was $CH_4$ and total flow rate of 100 sccm. The sample name corresponds to $Cr_1Ni_5$ in table 6. Scale bar denotes 1 μm.

| Sample formula | Denoted Name | Theoretical weight loss after full reduction/(%) | Experiment weight loss in H$_2$ atmosphere/(%) | Carbon yield (g C/g$_{cata.}$) |
|---|---|---|---|---|
| (Cr$_{2.5}$Ni$_{0.5}$)O$_4$ | Cr$_5$Ni$_1$ (FIG. 11A) | 28.66 | 3.4 | 1.27 |
| (Cr$_{2.0}$Ni$_{1.0}$)O$_4$ | Cr$_4$Ni$_2$ (FIG. 11B) | 28.23 | 6.87 | 2.18 |
| (Cr$_{1.5}$Ni$_{1.5}$)O$_4$ | Cr$_3$Ni$_3$ (FIG. 11C) | 27.82 | 10.47 | 3.55 |
| (Cr$_{1.0}$Ni$_{2.0}$)O$_4$ | Cr$_2$Ni$_4$ (FIG. 11D) | 27.42 | 14.08 | 5.48 |
| (Cr$_{0.5}$Ni$_{2.5}$)O$_4$ | Cr$_1$Ni$_5$ (FIG. 11E) | 27.04 | 17.77 | 6.82 |

FESEM images of chromium oxide doped with nickel samples after treated at 850° C. under pure CH$_4$ atmosphere for 5 hours are shown in FIG. 11A to 11E. As shown in FIG. 11A to 11E, the deposited carbon materials are characterized by bamboo-shaped carbon nanotube with spherical carbon particles. The interesting finding is that the shape of formed carbon is significantly affected by the doping level.

Figure 11F:
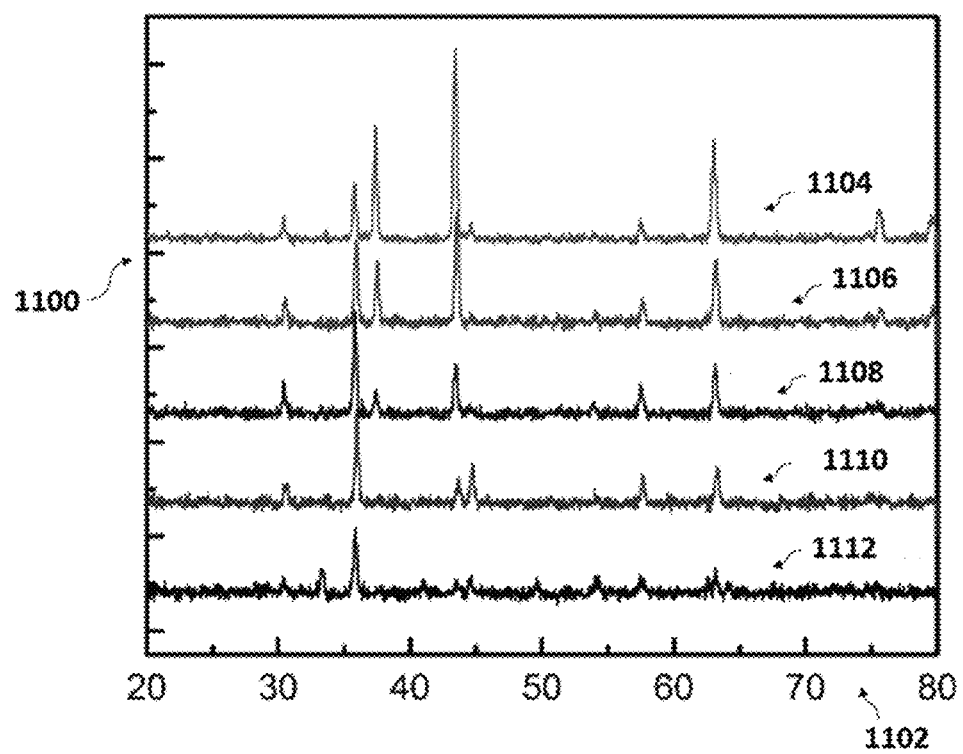
FIG. 11F shows XRD results of the present composite catalyst of various samples based on chromium oxide doped with nickel metal (in this instance the precursor used for doping the nickel metal is NiO) calcined at 900° C. for 6 hours in static air. 1104, 1106, 1108, 1110, 1112 correspond to sample $Cr_1Ni_5$, $Cr_2Ni_4$, $Cr_3Ni_3$, $Cr_4Ni_2$, $Cr_5Ni_1$, respectively (see table 6). The vertical axis 1100 denotes intensity (in a.u.—arbitrary unit) and the horizontal axis 1102 denotes 2θ (in)°.
Figure 11G:
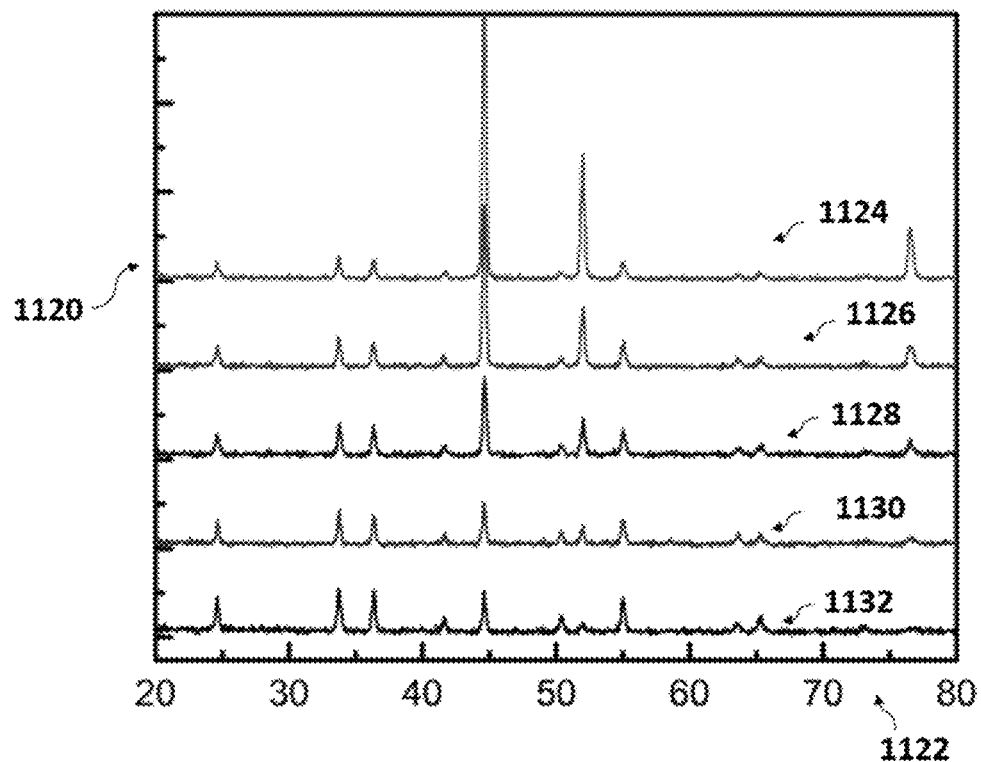
FIG. 11G shows XRD results of the present composite catalyst of various samples based on chromium oxide doped with nickel metal (in this instance the precursor used for doping the nickel metal is NiO) treated under reducing gas stream having 70 vol. % Ar blended with 30 vol. % Hz. The flow rate of gas was set at 100 sccm. 1124, 1126, 1128, 1130, 1132, correspond to sample $Cr_1Ni_5$, $Cr_2Ni_4$, $Cr_3Ni_3$, $Cr_4Ni_2$, $Cr_5Ni_1$, respectively (see table 6). The vertical axis 1120 denotes intensity (in a.u.—arbitrary unit) and the horizontal axis 1122 denotes 2θ (in)°.
Figure 11H:
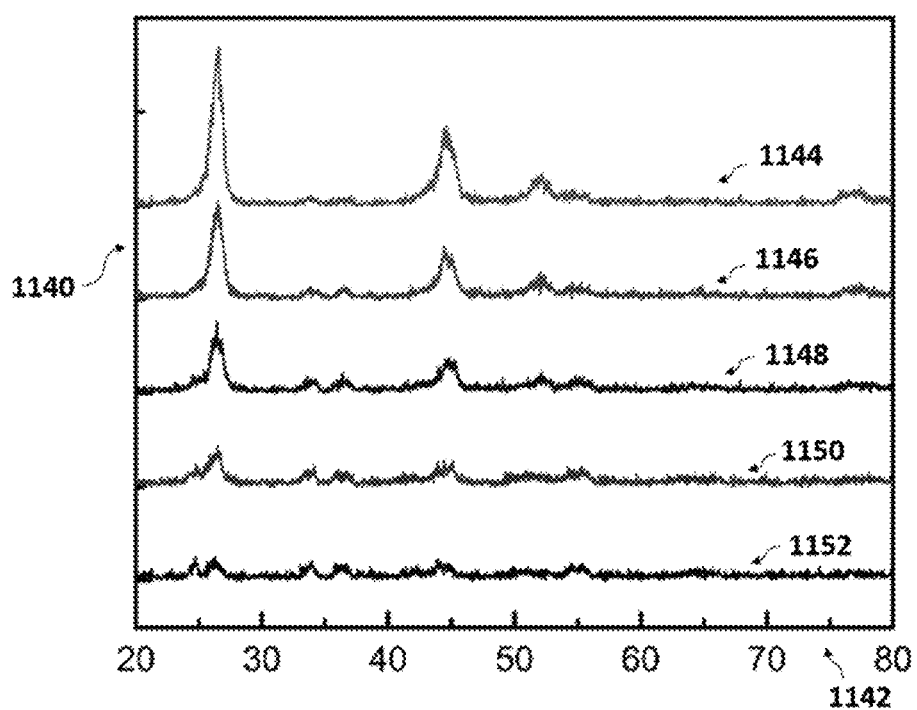
FIG. 11H shows XRD results of the present composite catalyst of various samples based on chromium oxide doped with nickel metal (in this instance the precursor used for doping the nickel metal is NiO) treated at 850° C. for 5 hours under $CH_4$ atmosphere. The flow rate of gas was set 100 sccm. 1144, 1146, 1148, 1150, 1152 correspond to sample $Cr_1Ni_5$, $Cr_2Ni_4$, $Cr_3Ni_3$, $Cr_4Ni_2$, $Cr_5Ni_1$, respectively (see table 6). The vertical axis 1140 denotes intensity (in a.u.—arbitrary unit) and the horizontal axis 1142 denotes 2θ (in)°.

XRD results of the samples treated at different condition are shown in FIG. 11F to 11G. As shown in FIG. 11F, second phase is detected in samples calcined at 900° C. for 6 hours, which meant the solubility of nickel oxide in chromium oxide is lower. The diffraction reflection at ~26.4° is attributed to graphite (see FIG. 11H), and the intensity of diffraction peak increased with the decreasing in doping level, which meant carbon materials yield also increased with the increase in doping level. The reflection at ~44.5° is attributed to the overlapping peak of C, Cr, Ni. The XRD results are consistent with the result observed via FESEM.

Example 8: Fabrication Synthesis of Composite Catalyst (Manganese Doped with Ni)

MnCO$_3$ is mixed with nickel oxide (NiO) with the different metal atomic ratio (see column under "sample formula" in Table 7). In this example, nickel oxide is the precursor (i.e. dopant precursor) for nickel as the catalytic transition metal in the present composite catalyst. The weight change of manganese doped NiO based catalyst is shown in Table 7. With the increase of the dopant material, the carbon yield increased first and then decreased. This phenomenon indicated that there may be a specific amount of dopant to maximize the carbon formation. The carbon yield after 5 hours testing is lower than that of the base NiO catalyst of 5.37 g $C/g_{cata.}$.

TABLE 7

Weight Change of Present Composite Catalyst

Figure 12A:
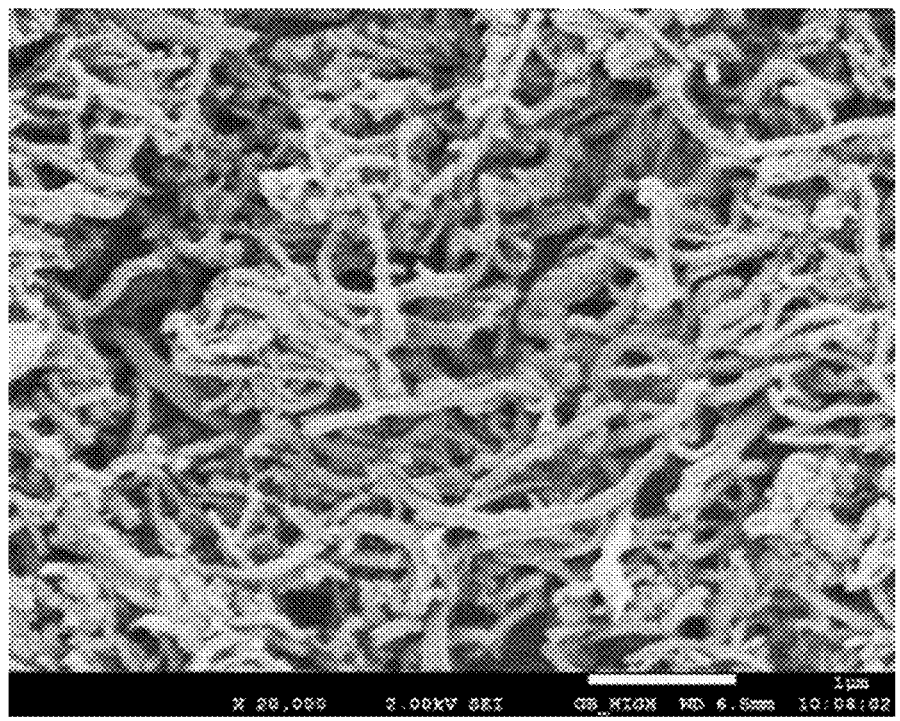
FIG. 12A shows a FESEM image of carbon deposited on a composite catalyst of the present disclosure, wherein the composite catalyst is based on the manganese and nickel treated at 850° C. for 5 hours in $CH_4$ atmosphere. The feedstock was $CH_4$ and total flow rate of 100 sccm. The sample name corresponds to $Mn_5Ni_1$ in table 7. Scale bar denotes 1 μm.
Figure 12B:
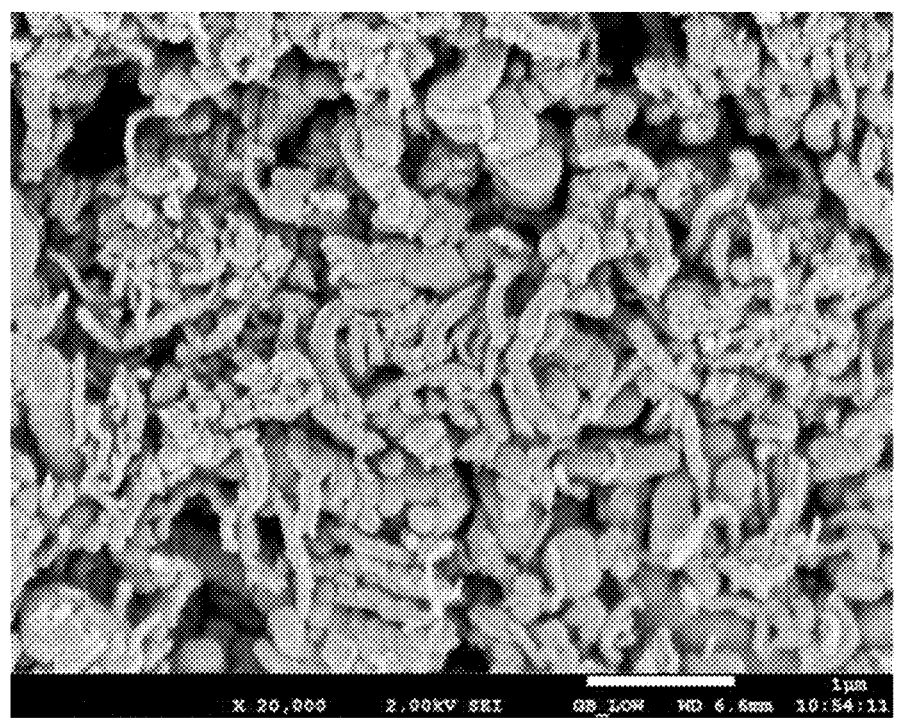
FIG. 12B shows a FESEM image of carbon deposited on a composite catalyst of the present disclosure, wherein the composite catalyst is based on the manganese and nickel treated at 850° C. for 5 hours in $CH_4$ atmosphere. The feedstock was $CH_4$ and total flow rate of 100 sccm. The sample name corresponds to $Mn_4Ni_2$ in table 7. Scale bar denotes 1 μm.
Figure 12C:
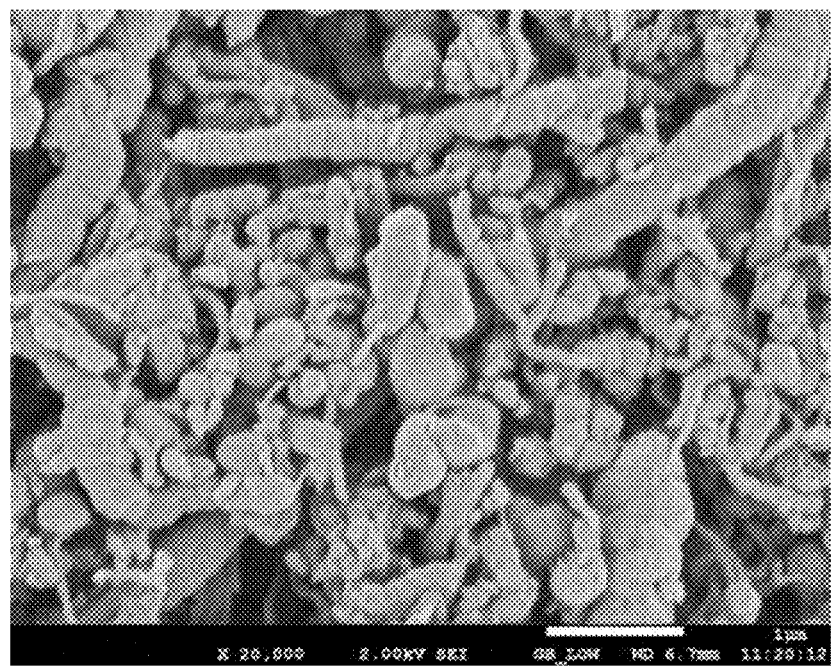
FIG. 12C shows a FESEM image of carbon deposited on a composite catalyst of the present disclosure, wherein the composite catalyst is based on the manganese and nickel treated at 850° C. for 5 hours in $CH_4$ atmosphere. The feedstock was $CH_4$ and total flow rate of 100 sccm. The sample name corresponds to $Mn_3Ni_3$ in table 7. Scale bar denotes 1 μm.
Figure 12D:
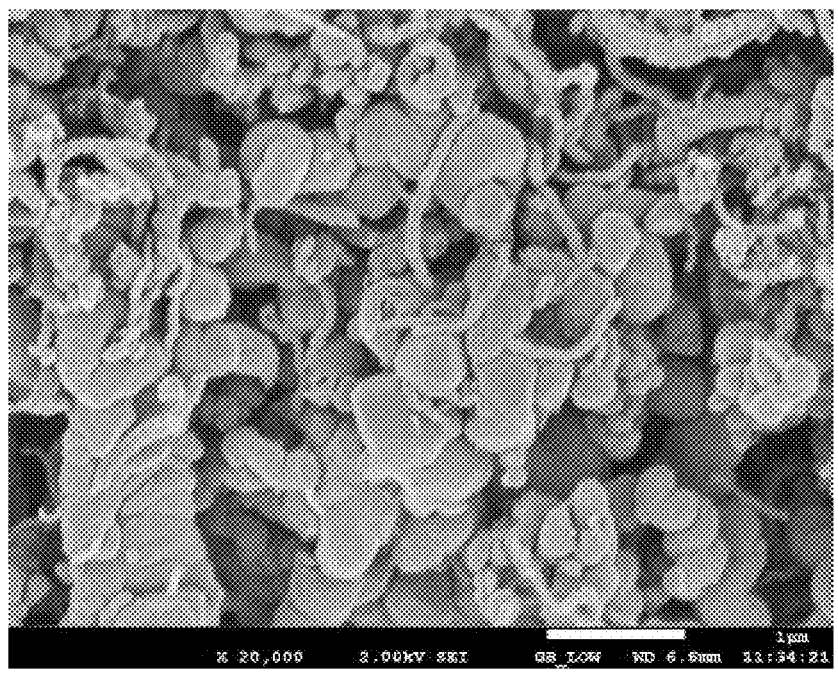
FIG. 12D shows a FESEM image of carbon deposited on a composite catalyst of the present disclosure, wherein the composite catalyst is based on the manganese and nickel treated at 850° C. for 5 hours in $CH_4$ atmosphere. The feedstock was $CH_4$ and total flow rate of 100 sccm. The sample name corresponds to $Mn_2Ni_4$ in table 7. Scale bar denotes 1 μm.
Figure 12E:
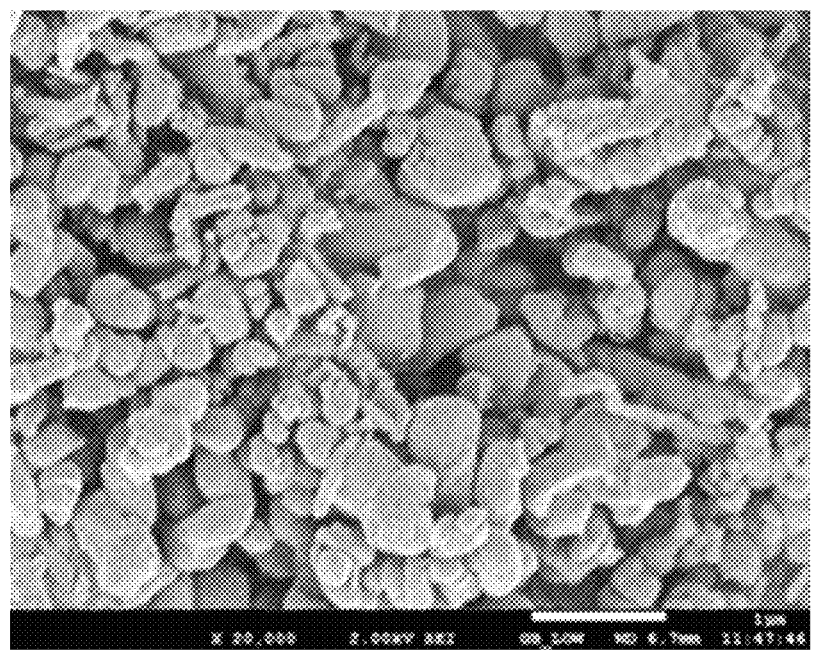
FIG. 12E shows a FESEM image of carbon deposited on a composite catalyst of the present disclosure, wherein the composite catalyst is based on the manganese and nickel treated at 850° C. for 5 hours in $CH_4$ atmosphere. The feedstock was $CH_4$ and total flow rate of 100 sccm. The sample name corresponds to $Mn_1Ni_5$ in table 7. Scale bar denotes 1 μm.

| Sample formula | Denoted Name | Theoretical weight loss after full reduction/(%) | Experiment weight loss in $H_2$ atmosphere/(%) | Carbon yield/ (g $C/g_{cata.}$) |
|---|---|---|---|---|
| $(Mn_{2.5}Ni_{0.5})O_4$ | $Mn_5Ni_1$ (FIG. 12A) | 27.74 | 9.95 | 2.63 |
| $(Mn_{2.0}Ni_{1.0})O_4$ | $Mn_4Ni_2$ (FIG. 12B) | 27.52 | 12.99 | 3.36 |
| $(Mn_{1.5}Ni_{1.5})O_4$ | $Mn_3Ni_3$ (FIG. 12C) | 27.30 | 15.97 | 4.43 |
| $(Mn_{1.0}Ni_{2.0})O_4$ | $Mn_2Ni_4$ (FIG. 12D) | 27.08 | 18.02 | 5.17 |
| $(Mn_{0.5}Ni_{2.5})O_4$ | $Mn_1Ni_5$ (FIG. 12E) | 26.87 | 19.78 | 4.93 |

FESEM images of manganese doped nickel samples after treated at 850° C. under pure $CH_4$ atmosphere for 5 h are shown in FIG. 12A to 12E. As shown in FIG. 12A to 12E, the deposited carbon materials are characterized by bamboo-shaped carbon nanotube with spherical carbon particles. The interesting finding is that the shape of formed carbon is significantly affected by the doping level.

Figure 12F:
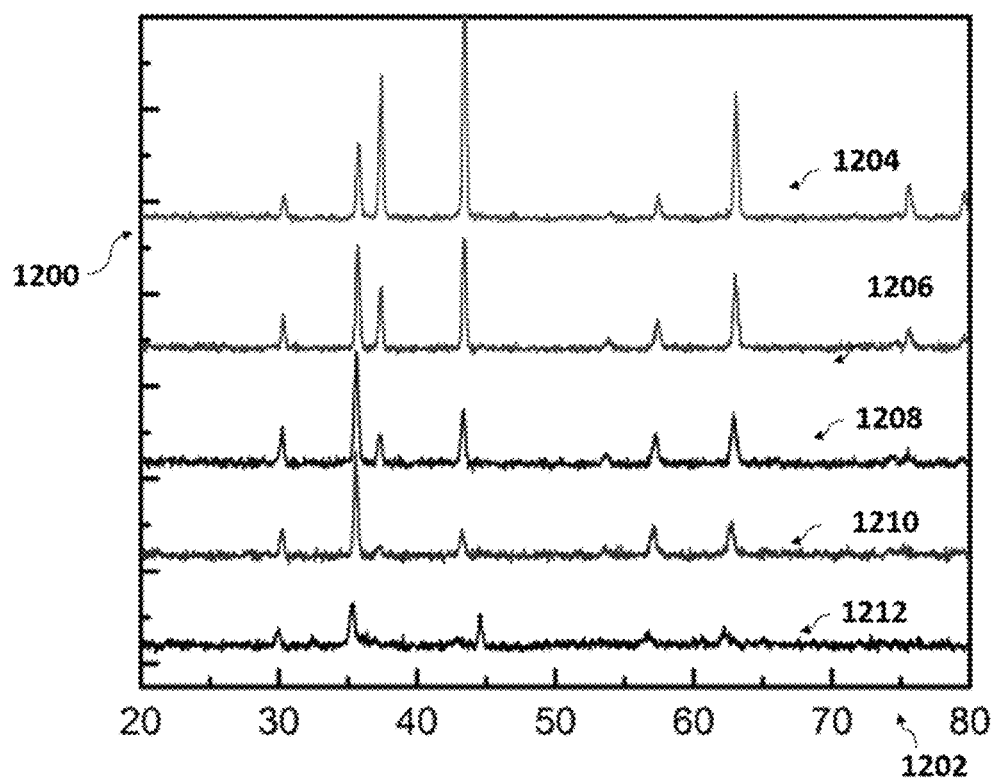
FIG. 12F shows XRD results of the present composite catalyst of various samples based on manganese doped with nickel metal (in this instance the precursor used for doping the nickel metal is NiO) calcined at 900° C. for 6 hours in static air. 1204, 1206, 1208, 1210, 1212 correspond to sample $Mn_1Ni_5$, $Mn_2Ni_4$, $Mn_3Ni_3$, $Mn_4Ni_2$, $Mn_5Ni_1$, respectively (see table 7). The vertical axis 1200 denotes intensity (in a.u.—arbitrary unit) and the horizontal axis 1202 denotes 2θ (in)°.
Figure 12G:
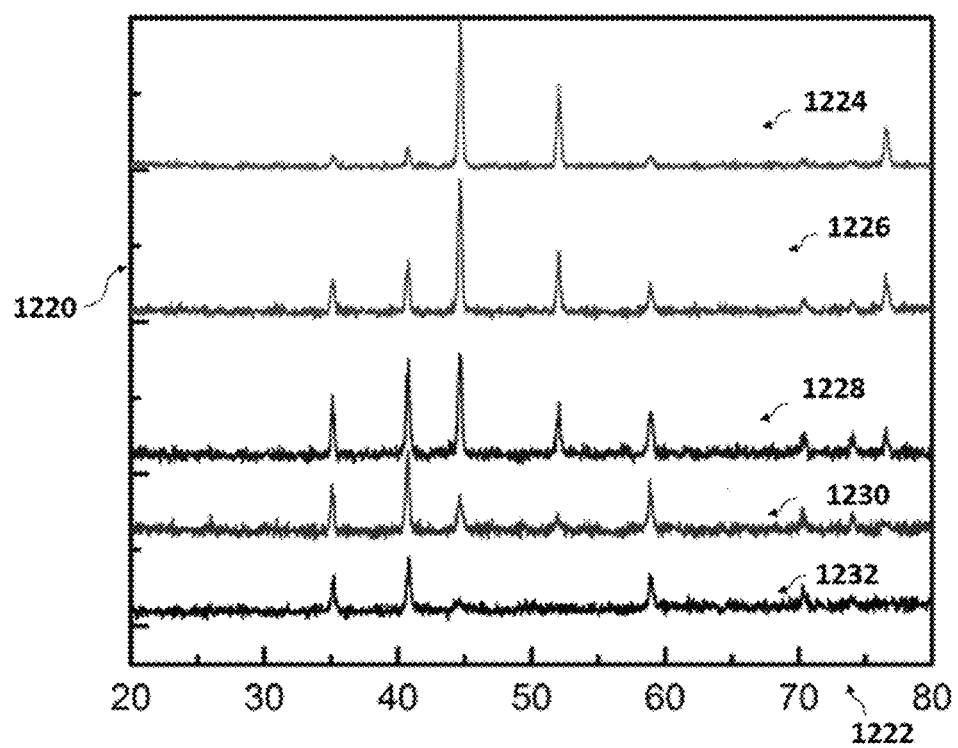
FIG. 12G shows XRD results of the present composite catalyst of various samples based on manganese doped with nickel metal (in this instance the precursor used for doping the nickel metal is NiO) treated under reducing gas stream having 70 vol. % Ar blended with 30 vol. % $H_2$. The flow rate of gas was set at 100 sccm. 1224, 1226, 1228, 1230, 1232, correspond to sample $Mn_1Ni_5$, $Mn_2Ni_4$, $Mn_3Ni_3$, $Mn_4Ni_2$, $Mn_5Ni_1$, respectively (see table 7). The vertical axis 1220 denotes intensity (in a.u.—arbitrary unit) and the horizontal axis 1222 denotes 2θ (in)°.
Figure 12H:
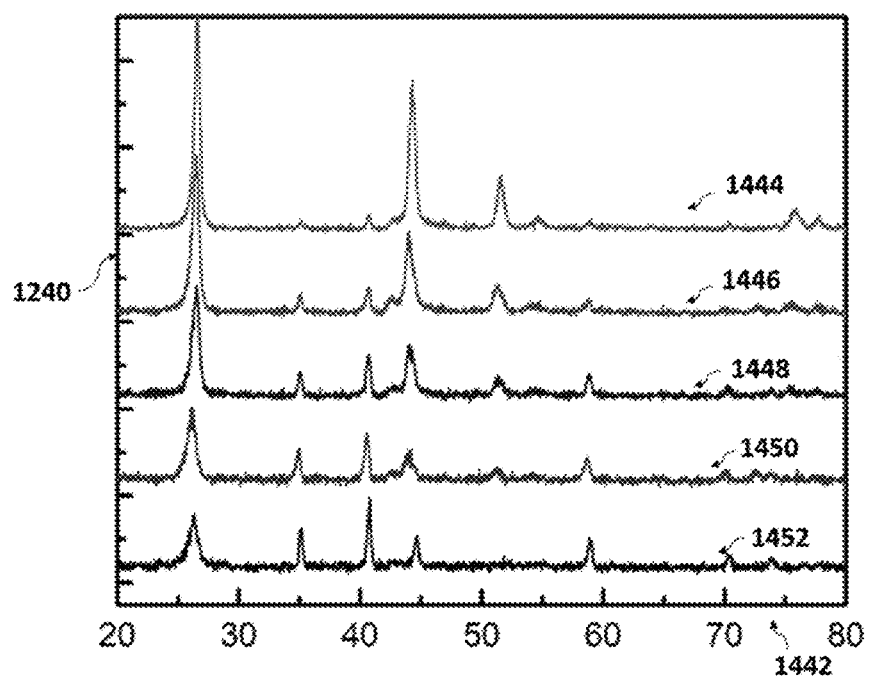
FIG. 12H shows XRD results of the present composite catalyst of various samples based on manganese doped with nickel metal (in this instance the precursor used for doping the nickel metal is NiO) treated at 850° C. for 5 hours under $CH_4$ atmosphere. The flow rate of gas was set 100 sccm. 1244, 1246, 1248, 1250, 1252 correspond to sample $Mn_1Ni_5$, $Mn_2Ni_4$, $Mn_3Ni_3$, $Mn_4Ni_2$, $Mn_5Ni_1$, respectively (see table 7). The vertical axis 1240 denotes intensity (in a.u.—arbitrary unit) and the horizontal axis 1242 denotes 2θ (in)°.

XRD results of the samples treated at different condition are shown in FIG. 12F to 12H. As shown in FIG. 12F, second phase is detected in samples calcined at 900° C. for 6 h, which meant the solubility of nickel oxide in manganese oxide is lower. The diffraction reflection at ~26.4° is attributed to graphite (see FIG. 12H), and the intensity of diffraction peak increased with the decreasing in doping level, which meant carbon materials yield also increased with the increasing in doping level. The reflection at ~44.5° is attributed to the overlapping peak of C, Mn, Ni. The XRD results are consistent with the result observed via FESEM.

Example 9: Fabrication Synthesis of Composite Catalyst (Co-doped Cr/Ni/Mn/Co/Fe)

Figure 13A:
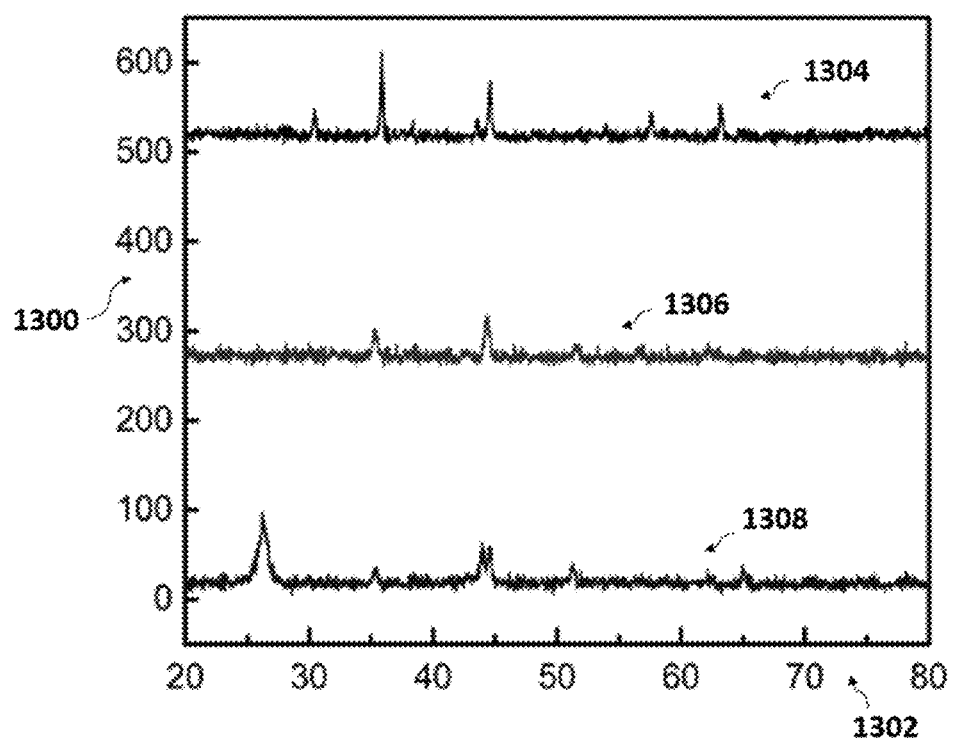
FIG. 13A shows XRD results of a composite catalyst of the present disclosure, wherein the composite catalyst is co-doped with cobalt, chromium, nickel, iron and manganese treated at three different conditions denoted by plots 1304, 1306, 1308. Plot 1304 corresponds to treatment of calcination at 900° C. for 6 hours in static air, plot 1306 corresponds to a treatment under reducing gas stream having 70 vol. % Ar blended with 30 vol. % $H_2$, and plot 1308 corresponds to a treatment at 850° C. for 5 hours under $CH_4$ atmosphere. The flow rate of gas was set 100 sccm. The vertical axis 1300 denotes intensity (in a.u.—arbitrary unit) and the horizontal axis 1302 denotes 2θ (in)°.
Figure 13B:
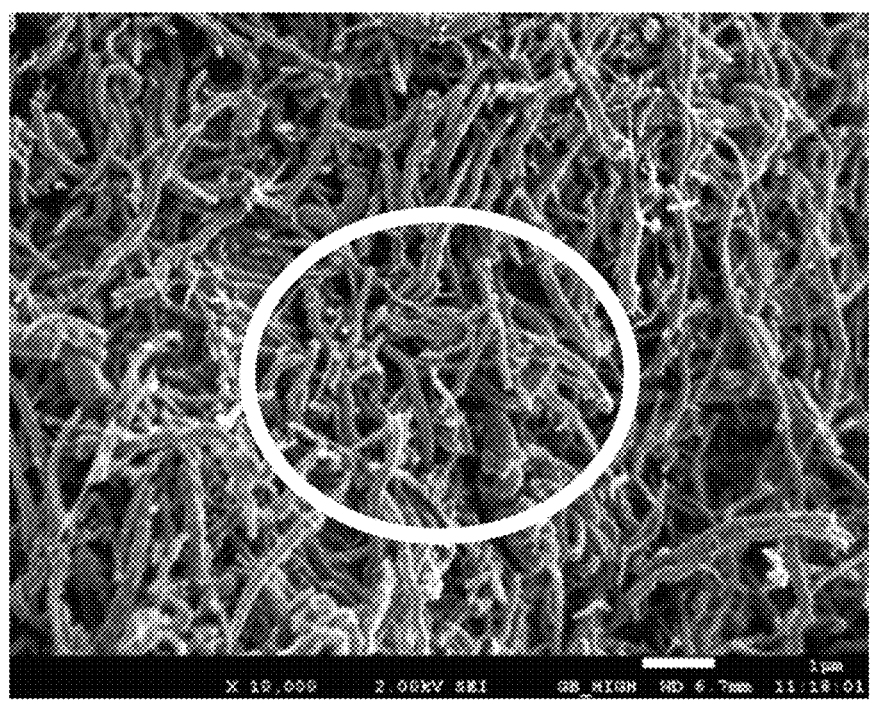
FIG. 13B shows a FESEM image of carbon deposited on the composite catalyst co-doped with cobalt, chromium, nickel, iron and manganese. Scale bar denotes 1 μm.
Figure 13C:
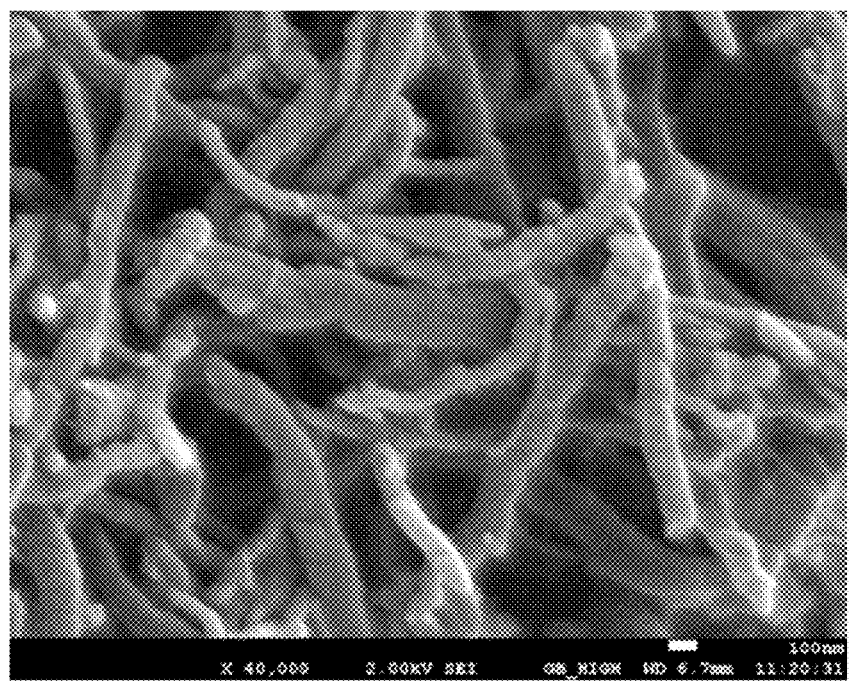
FIG. 13C shows a magnified FESEM image of the circled area in FIG. 13B. Scale bar denotes 100 nm.

XRD results, optical photos and FESEM images of deposited carbon material over the $NiO/Cr_2O_3/MnCO_3/Co_3O_4/Fe_2O_3$ co-doped composite catalyst via methane cracking reaction are shown in FIG. 13A to 13C.

The XRD results of co-doped Cr/Ni/Mn/Co/Fe catalyst under methane atmosphere are shown in FIG. 13A. The diffraction reflections at 26.2° and 44.4° are attributed to the (002) and (011) crystalline planes of graphite. As shown in FIG. 13A, the diffraction reflection at 26.2° is attributed to graphite. The reflection at ~44.5° is attributed to the overlapping peak of C, Co, and Cr.

The sample composite catalyst to accelerate methane cracking was then tested at 850° C. for 5 hours with 100 sccm methane flow rate. Co-doping with Co, Cr, Ni, Fe, Mn, showed strong catalytic performance, and the volumes of obtained carbon materials were appreciably larger than that of catalyst itself. The FESEM images FIG. 13B to 13C showed that the deposited carbon materials are characterized by bamboo shaped nano-tubes.

Figure 14:
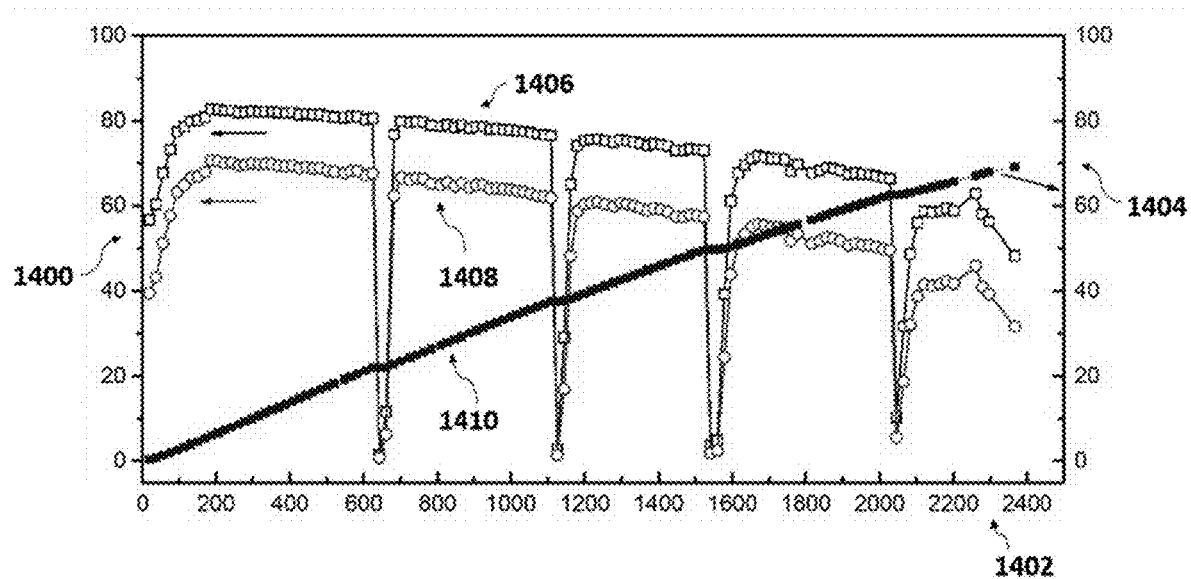
FIG. 14 is catalyst durability test in a fixed bed reactor for 5 days (accumulated testing time is roughly 40 hours). The hydrogen vol. % is roughly 80% and degrade with time. The accumulated carbon is roughly 60 times of the catalyst weight. The vertical axis 1400 denotes $H_2$ volume/conversion rate (%), the vertical axis 1404 denotes accumulated carbon (g C/$g_{cata.}$) and the horizontal axis 1402 denotes time (mins). The weight of catalyst was 0.5 g. The methane flow rate was 50 sccm. The operation temperature was 700° C. 1406 denotes for the hydrogen vol. %, 1408 denotes for conversion rate % of methane into products, and 1410 denotes for the carbon accumulated on the present composite catalyst.

Durability test of the composite catalyst is conducted with methane flow rate of 50 sccm at 700° C. FIG. 14 shows that with the time goes by the catalyst activity is gradually degrading duo to the carbon deposition. The methane conversion is lower, and the carbon is accumulating up to about 50 to 70 times of the catalyst weightage. With the total testing time of roughly 2400 mins, the methane conversion dropped from 60% to 40%. The catalyst is still active before the end of the test. The test was terminated due to the blockage of the fixed bed reactor.

Figure 15:
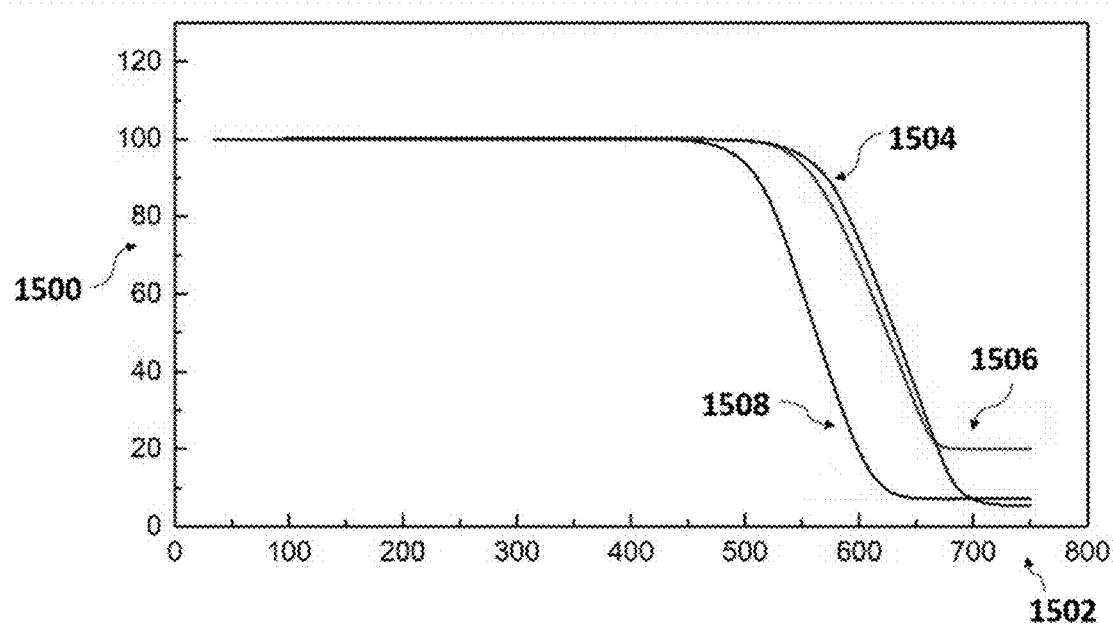
FIG. 15 is a thermal gravimetric analysis of carbon specimens from various sources. The vertical axis 1500 and horizontal axis 1502 denote % mass and temperature (° C.), respectively. Curve 1504 denotes carbon nano-onions (CNOs) with purification treatment, wherein the % mass at end of TGA is about 5.35. Curve 1506 denotes CNOs without purification treatment, wherein the % mass at end of TGA is about 19.975. Curve 1508 denotes a composite catalyst co-doped with cobalt, chromium, nickel, iron and manganese, wherein the % mass at end of TGA is about 7.148.

The thermal gravimetric analysis (TGA) is conducted to evaluate amount of catalyst wrapped in the carbon products (se FIG. 15). With the temperature increased, the carbon products are oxidized and the residue is the catalyst wrapped in the as-synthesized carbon material. The lower the TGA value indicated that the sample has higher carbon resistance. It is found that the present composite catalyst sample has lesser metal catalysts wrapped in the carbon product than commercial's specimen without purification. The residue contributed to 7.148% of the total mass.

Example 10: Fabrication Synthesis of Composite Catalyst ($La_{0.75}Sr_{0.25}Cr_{0.5}Mn_{0.3}Ni_xO_{3-d}$ (LSCMN Oxide))

LSCMN oxide were synthesized using an aqueous gel-casting method including $La_2O_3$ (99.9%), $SrCO_3$ (99.9%), $Cr_2O_3$ (99%), NiO (99%) and $MnCO_3$ (99%) (all from Sigma-Aldrich) as raw materials. $La_2O_3$ (61.09 g), $SrCO_3$ (18.45 g), $Cr_2O_3$ (18.99 g), $MnCO_3$ (17.24 g) and NiO (7.46 g) were ball milled in iso-propanol for 24 hours before drying at 80° C. to afford premixed powders (in-situ synthesized $LSCMNi_{0.2}$ perovskite oxide). A monomer solution was then prepared using about 13 g to 33 g distilled water with acrylamide (AM) (7.77 g) and N,N'-methylenebisacry-lamide (MBAM) (0.51 g). The AM to MBAM weight ratio was 15:1.

The premixed powders were then mixed with the monomer solution and a dispersant (about 0.8 g to 3.2 g, in one example 1.3 g) before planetary ball milling for 30 minutes. APS (7.7 g) 2 wt. % solution was added as the initiator and TEMED (7.7 g) 2 wt. % solution was added as the catalyst. The resulting slurry was poured into a beaker, then dried, calcined at about 1000° C. to 1400° C. for about 10 hours to 20 hours in air. The LSCMN oxide composite catalyst of the present disclosure and in the present example may include $La_{0.75}Sr_{0.25}Cr_{0.5}Mn_{0.5}Ni_xO_3$, wherein x denotes a real number ranging from 0 to 3 (e.g. more than 0 and to 3).

Example 11: Fabrication Fabrication of Composite Catalyst Beads

Synthesized catalyst-based composite beads were fabricated using an aqueous gel-casting method including synthesized catalyst and certain amount of sintering additives. A monomer solution was then prepared using about about 28 g to 40 g distilled water with AM (7.25 g) ($C_2H_3CONH_2$, Sigma-Aldrich) and MBAM (0.48 g) ($C_2H_3CONHCH_2NHCOC_2H_3$, Sigma-Aldrich). The AM to MBAM weight ratio was 15:1. The premixed powders, monomer solution and dispersant (about 1 g to 5 g, in one example 1.6 g) were then mixed before the resulting slurry was planetary ball milled for 30 min. Initiator APS (7.25 g) (($NH_4)_2S_2O_8$) 2 wt. % solution and catalyst TEMED (7.25 g) 2 wt. % solution was then added to the slurry to afford a mixed slurry. The mixed slurry was then shaped and dropped into an oil-based media via a dropping nozzle. The temperature of the oil-based media was maintained at about 70° C. to 90° C. The resulting green composite beads were then filtered out, washed, dried, and sintered at about 1100° C. to 1500° C. for about 2 to 5 hours in air to afford composite dense beads.

Example 12: A Method of Producing the Present Composite Catalyst

The present disclosure provides a method of forming the present composite catalyst. The present composite catalyst may be a metal oxide composite catalyst. The method may include mixing a metal oxide, at least two monomers and a dispersant to produce a slurry, gel-casting the slurry to produce a colored (e.g. green) metal oxide composite, and sintering the colored metal oxide composite to produce the metal oxide composite.

The metal oxide may include a cobalt-based metal oxide, a nickel-based metal oxide, a chromium-based metal oxide, an iron-based metal oxide, or any combination thereof.

The mixing may further include adding at least one sintering additive in the mixing. The sintering may be carried out at a sintering temperature in the range of 1100° C. to 1500° C.

The metal oxide composite may be self-supported (i.e use without any support or not immobilized to a support). The metal oxide may have a weight percentage greater than 80 wt. %, wherein the wt. % is based on the composite catalyst.

The solubility of the catalytic transition metal in the metal oxide substrate, which serves as a matrix the catalytic transition metal can be solubilized in, may vary under different atmosphere.

The present disclosure also provides for use of the metal oxide composite catalyst for catalyzing pyrolysis of alkyl gases to produce hydrogen gas and high value-added carbon materials. The alkyl gases can include, but is not limited to, methane.

The thermal expansion coefficient of metal oxide composite catalyst may be different from that of carbon deposited thereon.

While the present disclosure has been particularly shown and described with reference to specific embodiments, it should be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

The invention claimed is:

1. A composite catalyst for methane cracking, the composite catalyst comprising:
   a substrate formed of a metal oxide; and
   one or more catalytic transition metals solubilized in the metal oxide,
   wherein the metal oxide comprises a metal which differs from the one or more catalytic transition metals,
   wherein the metal oxide forms a matrix which the one or more catalytic transition metals are solubilized in to render transition metal ions from the one or more catalytic transition metals,
   wherein the transition metal ions under a reducing atmosphere diffuse to reside as transition metal nanoparticles at a surface of the substrate and the transition metal nanoparticles under an oxidizing atmosphere diffuse away from the surface to reside as transition metal ions in the metal oxide, wherein the oxidizing atmosphere comprises:
   oxygen and/or air; and
   a temperature ranging from 800° C. to 1400° C., and
   wherein the transition metal nanoparticles at the surface induce carbon from the methane cracking to deposit on the transition metal nanoparticles and have the carbon deposited grow away from the substrate.

2. The composite catalyst of claim 1, wherein the metal oxide and the carbon deposited have different thermal expansion coefficients, which renders separation of the carbon from the substrate when the composite catalyst is cooled after being channeled out of a reactor operable to crack methane.

3. The composite catalyst of claim 1, wherein the metal oxide comprises a cobalt-based metal oxide, a nickel-based metal oxide, a chromium-based metal oxide, an iron-based metal oxide, manganese-based oxide, or a molybdenum-based metal oxide, wherein the chromium-based metal oxide comprises chromium (III) oxide or lanthanum strontium manganese chromite.

4. The composite catalyst of claim 1, wherein the metal oxide has a spinel structure, a structure identical to a perovskite, or a double perovskite structure.

5. The composite catalyst of claim 1, wherein the one or more catalytic transition metals comprise cobalt, nickel, chromium, iron, manganese, molybdenum, tungsten, or vanadium.

6. The composite catalyst of claim 1, wherein the metal oxide comprises 50 wt % or more of the composite catalyst.

7. The composite catalyst of claim 1, wherein the reducing atmosphere comprises:
   hydrogen; and
   a temperature ranging from 400° C. to 1000° C.

8. The composite catalyst of claim 1, wherein the composite catalyst comprises the metal oxide and one catalytic transition metal, wherein the metal of the metal oxide and the one catalytic transition metal are present in a mole ratio ranging from 5:1 to 1:5.

9. The composite catalyst of claim 1, wherein the composite catalyst comprises $La_{0.75}Sr_{0.25}Cr_{0.5}Mn_{0.5}Ni_xO_3$, wherein x denotes a real number ranging from 0 to 3.

10. The composite catalyst of claim 1, further comprising a sintering additive, wherein the sintering additive comprise $ZrO_2$, $Al_2O_3$, $CeO_2$, $SiO_2$, or a clay.

11. A method of producing the composite catalyst of claim 1, the method comprising:
    milling a mixture comprising transition metal oxide and a precursor of the one or more catalytic transition metals in an aqueous medium;
    drying the mixture to form a homogeneously mixed powder; and
    subjecting the homogenously mixed powder to calcination to produce the composite catalyst.

12. The method of claim 11, wherein the precursor of the one or more catalytic transition metals comprises cobalt oxide, nickel oxide, chromium oxide, iron oxide, manganese oxide, molybdenum oxide, tungsten oxide, or vanadium oxide.

13. The method of claim 11, further comprising sintering the composite catalyst.

14. The method of claim 13, wherein the calcination and the sintering are carried out at a temperature ranging from 900° C. to 1200° C. for 6 to 24 hours and 1200° C. to 1500° C. for 2 to 10 hours, respectively.

15. The method of claim 13, further comprising, prior to the sintering, milling the homogeneously mixed powder in the presence of an aqueous solution comprising at least two monomers, an initiator, a catalyst, and a dispersant.

16. The method of claim 15, wherein the at least two monomers comprise an acrylamide and/or N,N'-methylenebisacrylamide.

17. The method of claim 15, wherein the dispersant comprises ammonium poly(methacrylate).

18. The method of claim 15, further comprising, after milling the homogeneously mixed powder in the presence of the aqueous solution but prior to the calcination, mixing the homogeneously mixed powder with the initiator and the catalyst for polymerization of the at least two monomers.

19. The method of claim 15,
    wherein the initiator comprises ammonium bisulfate,
    wherein the catalyst comprises tetramethylethylenediamine.

* * * * *